(12) United States Patent
Liu et al.

(10) Patent No.: US 12,598,102 B2
(45) Date of Patent: Apr. 7, 2026

(54) SIGNAL TRANSMISSION METHOD AND APPARATUS

(71) Applicant: HUAWEI TECHNOLOGIES CO., LTD., Shenzhen (CN)

(72) Inventors: Fengwei Liu, Chengdu (CN); Minghui Xu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 89 days.

(21) Appl. No.: 18/477,820

(22) Filed: Sep. 29, 2023

(65) Prior Publication Data

US 2024/0031213 A1    Jan. 25, 2024

Related U.S. Application Data

(63) Continuation of application No. PCT/CN2021/084086, filed on Mar. 30, 2021.

(51) Int. Cl.
*H04L 27/26*     (2006.01)
*H04L 5/00*     (2006.01)

(52) U.S. Cl.
CPC ........ *H04L 27/2636* (2013.01); *H04L 5/0007* (2013.01)

(58) Field of Classification Search
CPC ... H04L 27/2636; H04L 5/0007; H04L 5/001; H04L 27/2627; H04L 27/2628; H04L 27/2634; H04L 27/2633; H04L 27/263; H04L 5/0005
See application file for complete search history.

(56) References Cited

U.S. PATENT DOCUMENTS

| | | | |
|---|---|---|---|
| 11,101,856 B2* | 8/2021 | Park | H04B 7/0639 |
| 2011/0134902 A1 | 6/2011 | Ko et al. | |
| 2012/0076028 A1* | 3/2012 | Ko | H04B 7/0417 |
| | | | 370/252 |

(Continued)

FOREIGN PATENT DOCUMENTS

| | | |
|---|---|---|
| EP | 4113926 A1 | 1/2023 |
| WO | 2020222274 A1 | 11/2020 |

OTHER PUBLICATIONS

3rd Generation Partnership Project; Technical Specification Group Radio Access Network; NR; Physical channels and modulation (Release 16), 3GPP TS 38.211 V16.1.0 (Mar. 2020), Technical Specification, total 130 pages.

*Primary Examiner* — Khanh C Tran
(74) *Attorney, Agent, or Firm* — Rimon PC

(57) ABSTRACT

This application discloses a signal transmission method and apparatus, to implement signal transmission by using a multi-stream DFT-s-OFDM waveform. The method includes: precoding N streams of signals based on a first codebook before sending, to obtain N1 precoded signals, where a quantity of non-zero elements in each row of the first codebook is 1, the first codebook causes a phase difference between two of the N streams of signals, and N and N1 are integers greater than 1; and sending the N1 precoded signals. A transmitting end introduces a phase offset between two transmit antenna ports in a precoding process, so that equivalent inter-stream interference is optimal after channel equalization is performed at a receiving end, to improve demodulation performance of the receiving end.

16 Claims, 13 Drawing Sheets

(56) References Cited

U.S. PATENT DOCUMENTS

| | | | |
|---|---|---|---|
| 2012/0327884 A1* | 12/2012 | Seo | H04L 1/0072 |
| | | | 370/329 |
| 2018/0241603 A1 | 8/2018 | Jia et al. | |
| 2020/0252954 A1* | 8/2020 | Kim | H04L 5/0007 |
| 2021/0050889 A1* | 2/2021 | Park | H04B 7/0482 |

* cited by examiner

| Input unit | — | Processor | — | Output unit |

SIGNAL TRANSMISSION METHOD AND APPARATUS

CROSS-REFERENCE TO RELATED APPLICATIONS

This application is a continuation of International Application No. PCT/CN2021/084086, filed on Mar. 30, 2021, the disclosure of which is hereby incorporated by reference in its entirety.

TECHNICAL FIELD

This application relates to the field of communication technologies, and in particular, to a signal transmission method and apparatus.

BACKGROUND

Research on multi-stream signal transmission is proposed with further increase (for example, above 6G) of operating frequencies, an increasing quantity of users, and improvement of UE hardware capabilities (an increasing quantity of transmit antennas). Currently, an existing protocol supports only a multi-stream cyclic prefix-orthogonal frequency division multiplexing (cyclic prefix-orthogonal frequency division multiplexing, CP-OFDM) waveform and a corresponding codebook. However, the CP-OFDM waveform has a high signal peak-to-average power ratio (peak-to-average power ratio, PAPR). Because a signal needs to operate in a linear interval of a power amplifier, the high PAPR reduces an average output power of the signal. A discrete Fourier transform spread orthogonal frequency division multiplexing (DFT-spread-OFDM, DFT-s-OFDM) waveform has good compatibility with the CP-OFDM waveform, and a PAPR of the DFT-s-OFDM waveform is significantly lower than that of the CP-OFDM waveform. For a same power amplifier, the DFT-s-OFDM waveform can reach a larger average output power than that of the CP-OFDM waveform. Therefore, the DFT-s-OFDM waveform can be used to improve uplink coverage. Therefore, how to transmit a signal by using the multi-stream DFT-s-OFDM waveform is an urgent problem to be resolved.

SUMMARY

This application provides a signal transmission method and apparatus, to implement signal transmission by using a multi-stream DFT-s-OFDM waveform.

According to a first aspect, an embodiment of this application provides a signal transmission method. The method includes: precoding N streams of signals based on a first codebook, to obtain N1 precoded signals, where a quantity of non-zero elements in each row of the first codebook is 1, the first codebook causes a phase difference between signals sent on two transmit antenna ports, and N and N1 are integers greater than 1; and sending the N1 precoded signals.

In this embodiment of this application, a transmitting end introduces a phase offset between the two transmit antenna ports in a precoding process, so that equivalent inter-stream interference is optimal after channel equalization is performed at a receiving end, to improve demodulation performance of the receiving end.

In a possible design, there is coherence between the two transmit antenna ports. In the foregoing design, accuracy of codebook selection can be improved, and impact of inter-stream interference can be reduced.

In a possible design, the first codebook belongs to a codebook set. A quantity of non-zero elements in each row of each codebook in the codebook set is 1. Each codebook in the codebook set causes a phase difference between signals sent on two transmit antenna ports. In the foregoing design, only one element in each row of each codebook in the codebook set is non-zero, so that a signal output through precoding includes an input signal. In addition, the codebook set provided in this embodiment of this application may be adapted to a time-varying channel between transmit antennas, to implement multi-stream DFT-s-OFDM transmission.

In a possible design, when a quantity of transmit antenna ports is 2, each codebook in the codebook set is:

$$\frac{1}{\sqrt{2}}\begin{bmatrix} 1 & 0 \\ 0 & e^{j\theta} \end{bmatrix}, \frac{1}{\sqrt{2}}\begin{bmatrix} 0 & 1 \\ e^{j\theta} & 0 \end{bmatrix}, \frac{e^{i8_0}}{\sqrt{2}}\begin{bmatrix} 1 & 0 \\ 0 & e^{j\theta} \end{bmatrix}, \text{ or } \frac{e^{i\theta_0}}{\sqrt{2}}\begin{bmatrix} 0 & 1 \\ e^{j\theta} & 0 \end{bmatrix}, \text{where}$$

$\theta$ is a phase difference between signals sent on the two transmit antenna ports. In the foregoing design, a phase difference can exist between signals sent on the two transmit antenna ports, without affecting a low PAPR feature of DFT-s-OFDM.

In a possible design, when a quantity of transmit antenna ports is 4, each codebook in the codebook set is:

$$e^{i\theta_0}\begin{bmatrix} 1 & 0 & e^{i\theta_2} & 0 \\ 0 & e^{i\theta_1} & 0 & e^{i\theta_3} \end{bmatrix}^T \text{ or } e^{i\theta_0}\begin{bmatrix} 1 & e^{i\theta_1} & 0 & 0 \\ 0 & 0 & e^{i\theta_2} & e^{i\theta_3} \end{bmatrix}^T, \text{where}$$

$\theta_1$ is a phase difference between a signal sent on a second transmit antenna port and a signal sent on a first transmit antenna port, $\theta_2$ is a phase difference between a signal sent on a third transmit antenna port and the signal sent on the first transmit antenna port, and $\theta_3$ is a phase difference between a signal sent on a fourth transmit antenna port and the signal sent on the first transmit antenna port. In the foregoing design, a phase difference can exist between signals sent on two transmit antenna ports, without affecting a low PAPR feature of DFT-s-OFDM.

In a possible design, a phase difference between signals sent on two transmit antenna ports meets the following formula:

$$\theta = \sum_{i=0}^{Q-1} b_i * \frac{\pi}{2^i}, \text{where}$$

Q is a quantity of phase difference quantization bits, $b_i$ is an $i^{th}$ bit from a least significant bit to a most significant bit in bits indicating a phase difference in a codebook index, and i={0, 1, 2, . . . , Q−1}. A codebook in the codebook set may be determined in the foregoing manner.

In a possible design, before the precoding N streams of signals based on a first codebook, the method further includes: modulating a to-be-sent bit according to a modulation scheme corresponding to a first modulation and coding scheme (MCS) index, where the modulation scheme corresponding to the first MCS index is π/2-binary phase shift keying (π/2-BPSK); and performing layer mapping on a modulated to-be-sent bit, to obtain the N streams of signals. In the foregoing design, modulation is performed according to the π/2-BPSK, so that the receiving end can perform channel equalization based on a feature of a π/2-BPSK modulated signal in frequency domain, to improve modulation performance.

In a possible design, the modulation scheme is determined based on a preset MCS table. The MCS table includes a plurality of MCS indexes. A bit rate corresponding to a largest MCS index corresponding to the π/2-BPSK modulation scheme is greater than 314 or greater than 314/1024. In the foregoing manner, the MCS table is expanded, so that the π/2-BPSK can correspond to a higher target bit rate, to achieve higher spectral efficiency. In this way, the transmitting end can achieve a higher target bit rate and higher spectral efficiency when the π/2-BPSK is selected for modulation, to improve demodulation performance without affecting a low PAPR feature.

In a possible design, the π/2-BPSK meets the following formula:

$$b(k) = e^{j\frac{\pi}{2}(k \bmod 2)}(1 - 2a(k)).$$

Alternatively, the pi/2-BPSK meets the following formula:

$$b(k) = \frac{e^{-j\frac{\pi}{4}}e^{j\frac{\pi}{2}(k \bmod 2)}}{\sqrt{2}}[(1 - 2a(k)) + j(1 - 2a(k))].$$

Alternatively, the pi/2-BPSK meets the following formula:

$$b(k) = \frac{e^{+j\frac{\pi}{4}}e^{j\frac{\pi}{2}(k \bmod 2)}}{\sqrt{2}}[(1 - 2a(k)) + j(1 - 2a(k))], \text{ where}$$

$a(k)$ is a $k^{th}$ bit of the to-be-sent bit, $b(k)$ is a modulation symbol corresponding to the $k^{th}$ bit, and k is an integer greater than 0 or equal to 0. In the foregoing implementation, the transmitting end performs phase shift on the signals by π/4 in a π/2-BPSK modulation process, so that the signals obtained through π/2-BPSK modulation are conjugate symmetric in frequency domain. Therefore, the receiving end may determine a sent signal based on both two conjugate symmetric signals, to improve an interference suppression dimension, better reduce impact of interference and/or noise on the signals, and improve demodulation performance.

In a possible design, a first codebook is a codebook with a lowest average interference power in average interference powers on a scheduling bandwidth in the codebook set. Alternatively, the first codebook is a codebook with a maximum average signal to interference ratio or a highest signal to interference plus noise ratio on the scheduling bandwidth in the codebook set. In the foregoing design, the first codebook is selected based on average interference powers/average signal to interference ratios/signal to interference plus noise ratios of codebooks on all scheduling bandwidths. Therefore, when the receive device determines a sent signal based on a conjugate equality feature and both two signals having a conjugate equality relationship on a scheduling bandwidth, equivalent inter-stream interference is lowest, thereby improving demodulation performance of the receive device.

In a possible design, a modulus value of a non-zero element meets a limitation on an antenna transmit power of the transmitting end.

According to a second aspect, an embodiment of this application provides a signal transmission method, including: receiving signals on M subcarriers, where the signals are signals modulated according to π/2-BPSK, and M is a quantity of subcarriers included in a scheduling bandwidth; and determining an $m_1^{th}$ signal and an $m_2^{th}$ signal. The $m_1^{th}$ signal is determined based on an $m_1^{th}$ received signal and an $m_2^{th}$ received signal. The $m_2^{th}$ signal is determined based on the $m_1^{th}$ received signal and the $m_2^{th}$ received signal. The $m_1^{th}$ signal is equal to a complex conjugate of the $m_2^{th}$ signal. The $m_1^{th}$ received signal is a signal received on an $m_1^{th}$ subcarrier in the M subcarriers. The $m_2^{th}$ received signal is a signal received on an $m_2^{th}$ subcarrier in the M subcarriers. The $m_1^{th}$ signal is a signal recovered on the $m_1^{th}$ subcarrier. The $m_2^{th}$ signal is a signal recovered on the $m_2^{th}$ subcarrier.

In this embodiment of this application, the receiving end combines, based on a feature of a π/2-BPSK signal in frequency domain, received signals, channels, and the like that correspond to conjugate symmetric subcarriers, to expand dimensions of the received signals and the channels, thereby improving an interference suppression capability.

In a possible design, a relationship between $m_1$ and $m_2$ is as follows:

$$\text{When } m_1 = \left\{0, \dots, \frac{M}{4} - 1\right\}, m_2 = \frac{M}{2} - m_1; \text{ and}$$

$$\text{when } m_1 = \left\{\frac{M}{2} + 1, \dots, \frac{3M}{4} - 1\right\}, m_2 = \frac{3M}{2} - m_1.$$

In a possible design, after the determining an $m_1^{th}$ signal and an $m_2^{th}$ signal, the method further includes: performing phase shift on M signals based on a first offset value. The first offset value is π/4 or −π/4, and the M signals are signals determined based on signals received on the M subcarriers. In the foregoing design, the receiving end can improve communication accuracy by recovering a phase of a signal.

In a possible design, before the determining an $m_1^{th}$ signal and an $m_2^{th}$ signal, the method further includes: performing, based on a second offset value, phase shift on the signals received on the M subcarriers. The second offset value is an opposite number of the first offset value. In the foregoing manner, a channel equalized signal may be conjugate symmetric about a symmetry point in frequency domain. Therefore, the receiving end may determine a sent signal based on both two conjugate symmetric signals, to improve an interference suppression dimension, better reduce impact of interference and/or noise on the signals, and improve demodulation performance.

In a possible design, the $m_1^{th}$ received signal, the $m_2^{th}$ received signal, and a sent signal corresponding to the $m_1^{th}$ signal meet the following formula:

$$Y_{m1} = \begin{bmatrix} h_{m_1} \\ h_{m_2}^* \end{bmatrix} d_{m1} + n_{m1}, \text{ where}$$

$$Y_{m1} = \begin{bmatrix} y_{m_1} \\ y_{m_2}^* \end{bmatrix}, y_{m_1}$$

is the $m_1{}^{th}$ received signal, $$y_{m_2}^*$$

is the $m_2{}^{th}$ received signal, $h_{m_1}$ is an equivalent channel of the $m_1{}^{th}$ subcarrier, $$h_{m_2}^*$$

is an equivalent channel of the $m_2{}^{th}$ subcarrier, $d_{m1}$ is the sent signal corresponding to the $m_1{}^{th}$ signal, and $n_{m_1}$ is a noise signal on the $m_1{}^{th}$ subcarrier. Therefore, the signal recovered on the $m_1{}^{th}$ subcarrier, that is, the $m_1{}^{th}$ signal $\hat{d}_{m1}$, may be determined based on the $m_1{}^{th}$ received signal, the $m_2{}^{th}$ received signal, and the foregoing formula.

In a possible design, the $m_1{}^{th}$ received signal, the $m_2{}^{th}$ received signal, and a sent signal corresponding to the $m_2{}^{th}$ signal meet the following formula:

$$Y_{m2} = \begin{bmatrix} h_{m_2} \\ h_{m_1}^* \end{bmatrix} d_{m2} + n_{m2}, \text{where}$$

$$Y_{m2} = \begin{bmatrix} y_{m_2} \\ y_{m_1}^* \end{bmatrix}, y_{m_1}$$

is the $m_1{}^{th}$ received signal, $$y_{m_2}^*$$

is the $m_2{}^{th}$ received signal, $h_{m_2}$ is the equivalent channel of the $m_2{}^{th}$ subcarrier, $$h_{m_1}^*$$

is the equivalent channel of the $m_1{}^{th}$ subcarrier, d $m_2$ is the sent signal corresponding to the me t signal, and n $m_2$ is a noise signal on the $m_2{}^{th}$ subcarrier. Therefore, the signal recovered on the $m_2{}^{th}$ subcarrier, that is, the $m_2{}^{th}$ signal $\hat{d}_{m2}$, may be determined based on the $m_1{}^{th}$ received signal, the $m_2{}^{th}$ received signal, and the foregoing formula.

In a possible design, the $m_2{}^{th}$ signal may also be determined based on the $m_1{}^{th}$ signal, for example, $\hat{d}_{m2}$=conj($\hat{d}_{m1}$), where conj( ) indicates calculation of a conjugate.

According to a third aspect, this application provides a communication apparatus. The apparatus may be a transmitting end, or may be a chip or a chip set in the transmitting end. The transmitting end may be a network device, or may be a terminal device. The apparatus may include a processing unit and a storage unit.

When the apparatus is a transmitting end, the processing unit may be a processor, and the storage unit may be a memory. The apparatus may further include a transceiver unit, and the transceiver unit is configured to communicate with a receiving end. The transceiver unit may be a transceiver. The storage unit is configured to store instructions, and the processing unit executes the instructions stored in the storage unit, to perform corresponding functions in the first aspect.

When the apparatus is a chip or a chip set in the transmitting end, the processing unit may be a processor, and the storage unit may be a storage unit (for example, a register or a cache) inside the chip or the chip set, or may be a storage unit (for example, a read-only memory or a random access memory) outside the chip or the chip set. The apparatus may further include a transceiver unit, and the transceiver unit is configured to communicate with a receiving end. The transceiver unit may be an input/output interface, a pin, a circuit, or the like. The storage unit is configured to store instructions, and the processing unit executes the instructions stored in the storage unit, to perform corresponding functions in the first aspect.

According to a fourth aspect, this application provides a communication apparatus. The apparatus may be a receiving end, or may be a chip or a chip set in the receiving end. The receiving end may be a terminal device or a network device. The apparatus may include a processing unit and a transceiver unit.

When the apparatus is a receiving end, the processing unit may be a processor, and the transceiver unit may be a transceiver. The apparatus may further include a storage unit, and the storage unit may be a memory. The storage unit is configured to store instructions, and the processing unit executes the instructions stored in the storage unit, to perform corresponding functions in the second aspect.

When the apparatus is a chip or a chip set in the receiving end, the processing unit may be a processor, and the transceiver unit may be an input/output interface, a pin, a circuit, or the like. The apparatus may further include a storage unit. The storage module may be a storage module (for example, a register or a cache) inside the chip or the chip set, or may be a storage module (for example, a read-only memory or a random access memory) outside the chip or the chip set. The storage unit is configured to store instructions, and the processing unit executes the instructions stored in the storage unit, to perform corresponding functions in the second aspect.

According to a fifth aspect, an embodiment of this application provides a communication apparatus. The apparatus includes a communication interface and a processor, and the communication interface is used by the apparatus to communicate with another device, for example, to send and receive data or a signal. For example, the communication interface may be a transceiver, a circuit, a bus, a module, or an interface of another type, and the another device may be a network device. The processor is configured to invoke a group of programs, instructions, or data, to perform the method described in any one of the first aspect or the possible designs of the first aspect, or perform the method described in any one of the second aspect or the possible designs of the second aspect. The apparatus may further include a memory, configured to store a program, instructions, or data invoked by the processor. The memory is coupled to the processor. When executing the program, the instructions, or the data stored in the memory, the processor may perform the method described in any one of the first aspect or the possible designs of the first aspect, or perform the method described in any one of the second aspect or the possible designs of the second aspect.

According to a sixth aspect, an embodiment of this application further provides a computer-readable storage medium. The computer-readable storage medium stores computer-readable instructions. When the computer-readable instructions are run on a computer, the method described in any one of the first aspect or the second aspect and the possible designs of the first aspect or the second aspect is performed.

According to a seventh aspect, an embodiment of this application provides a chip system. The chip system includes a processor, and may further include a memory, configured to implement the method described in any one of the first aspect or the second aspect and the possible designs of the first aspect or the second aspect. The chip system may include a chip, or may include a chip and another discrete device.

According to an eighth aspect, an embodiment of this application provides a communication system. The system includes a network device and a terminal device. The terminal device is configured to perform the method in any one of the first aspect or the possible designs of the first aspect. The network device is configured to perform the method in any one of the second aspect or the possible designs of the second aspect.

Alternatively, the terminal device is configured to perform the method in any one of the second aspect or the possible designs of the second aspect. The network device is configured to perform the method in any one of the first aspect or the possible designs of the first aspect.

According to a ninth aspect, a computer program product including instructions is provided. When the computer program product runs on a computer, the method described in any one of the first aspect or the second aspect and the possible designs of the first aspect or the second aspect is performed.

According to a tenth aspect, an embodiment of this application provides a communication apparatus. The communication apparatus includes a processor, a memory, and a transceiver. The transceiver is configured to receive a signal or send a signal. The memory is configured to store program code or instructions. The processor is configured to invoke the program code or the instructions from the memory to perform the method described in the first aspect or the second aspect.

According to an eleventh aspect, an embodiment of this application provides a communication apparatus. The communication apparatus includes a processor and an interface circuit. The interface circuit is configured to receive computer program code or instructions and transmit the computer program code or the instructions to the processor. The processor runs the computer program code or the instructions to perform the corresponding method according to the first aspect or the second aspect.

According to a twelfth aspect, an embodiment of this application provides a communication apparatus. For example, the communication apparatus may be a chip, and the communication apparatus includes a logic circuit and an input/output interface. The input/output interface is configured for the apparatus to communicate with a receiving end, for example, send a signal. The logic circuit is configured to run computer program code or instructions to perform the corresponding method according to the first aspect.

According to a thirteenth aspect, an embodiment of this application provides a communication apparatus. For example, the communication apparatus may be a chip, and the communication apparatus includes a logic circuit and an input/output interface. The input/output interface is configured for the apparatus to communicate with a transmitting end, for example, receive a signal. The logic circuit is configured to run computer program code or instructions to perform the corresponding method according to the second aspect.

For technical effect brought by any implementation of the third aspect to the thirteenth aspect, refer to beneficial effect in the corresponding method provided above. Details are not described herein again.

DESCRIPTION OF EMBODIMENTS

Figure 1:
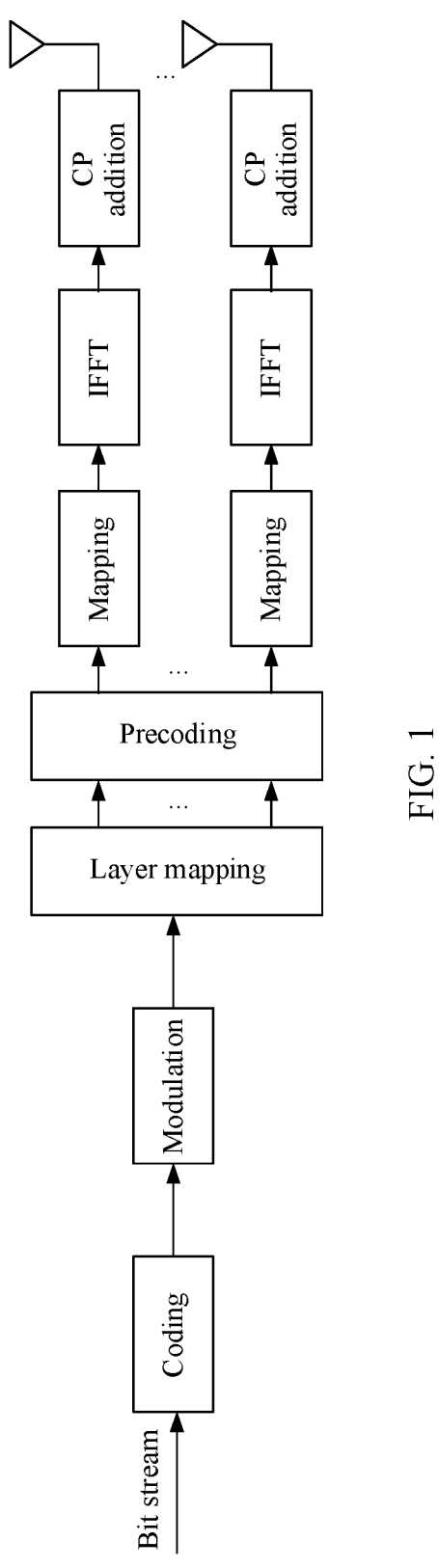
FIG. 1 is a schematic diagram of multi-stream CP-OFDM transmission according to an embodiment of this application.

The following describes in detail embodiments of this application with reference to accompanying drawings.

A next-generation wireless communication system (new radio, NR) protocol supports a cyclic prefix-orthogonal frequency division multiplexing (cyclic prefix-orthogonal frequency division multiplexing, CP-OFDM) waveform in a downlink, and supports both a CP-OFDM waveform and a discrete Fourier transform spread orthogonal frequency division multiplexing (DFT-spread-OFDM, DFT-s-OFDM) waveform in an uplink. The CP-OFDM waveform has flexible frequency division multiplexing, good compatibility with multiple input multiple output (multiple input multiple output, MIMO), and good link performance in a frequency selective channel. However, the CP-OFDM waveform has a high signal peak-to-average power ratio (peak-to-average power ratio, PAPR). Signals need to operate in a linear range of a power amplifier. Therefore, the high PAPR reduces an average output power of the signals. The DFT-s-OFDM waveform is compatible with the CP-OFDM waveform, and a PAPR of the DFT-s-OFDM waveform is significantly lower than that of the CP-OFDM waveform. For a same power amplifier, the DFT-s-OFDM waveform can reach a larger average output power than that of the CP-OFDM waveform. Therefore, the DFT-s-OFDM waveform can be used to improve uplink coverage.

In addition to supporting the DFT-s-OFDM waveform, in an existing protocol or design, it is further supported that when a waveform is the DFT-s-OFDM waveform, a modulation scheme is configured as $\pi/2$ shifted binary phase shift keying ($\pi/2$ shifted binary phase shift keying, pi/2-BPSK) to further improve coverage. Compared with quadrature phase shift keying (quadrature phase shift keying, QPSK), the modulation scheme has a lower PAPR. In addition, a frequency domain spectrum shaping technology may further be performed on a frequency domain signal during pi/2-BPSK modulation at a transmitting end to further reduce a PAPR of a sent signal, so as to reduce a backoff amount of a power amplifier (power amplifier, PA), improve a transmit signal power, and improve coverage.

In addition to reducing the PAPR of the output signal and improving the transmit signal power to improve the coverage, demodulation performance of a receiver can be further improved by using a precoding technology, a diversity technology, and the like. In other words, a demodulation signal-to-noise ratio (Signal-To-Noise Ratio, SNR) in a same modulation and coding mode can be reduced according to some preprocessing methods, so that the receiver can serve users over longer distances and improve the coverage.

The precoding technology is mainly used for MIMO transmission in a closed-loop transmission scheme. In this scheme, a base station may perform uplink channel estimation based on an uplink sounding reference signal (sounding reference signal, SRS) sent by user equipment (user equipment, UE), and send uplink precoding matrix indicator (transmitted precoding matrix indicator, TPMI) information to the UE in subsequent uplink scheduling information, and the UE performs uplink precoding based on an indication of the base station.

The current NR protocol supports only uplink CP-OFDM multi-stream transmission and TPMI-based precoding, and does not support multi-stream DFT-s-OFDM. However, with further increase of operating frequencies (for example, above 6 GHz), an increasing quantity of users, and improvement of UE hardware capabilities (an increasing quantity of transmit antennas), research on the multi-stream DFT-s-OFDM is proposed, to further reduce a bit rate of single-stream transmission with same spectral efficiency. An existing protocol supports only multi-stream CP-OFDM and a corresponding codebook, so how to design a codebook to adapt to the multi-stream DFT-s-OFDM, to reduce a demodulation SNR with same spectral efficiency without affecting a low PAPR feature of DFT-s-OFDM is an urgent problem to be resolved.

Transmission of the multi-stream CP-OFDM is performed by using a TPMI codebook. A specific flowchart may be shown in FIG. 1. A to-be-sent bit stream is sent sequentially after encoding, modulation, layer mapping, precoding, mapping, inverse fast Fourier transform (inverse fast fourier transformation, IFFT), and cyclic prefix (cyclic prefix, CP) addition. A codebook used in precoding is a codebook indicated by a TPMI, and the TPMI codebook may be obtained based on a channel measured by an uplink SRS. Codebooks that can be configured for different quantities of transport streams and different transmit antennas are shown in Table 1 or Table 2. A precoding matrix used for two transport streams and two transmit antennas may be shown in Table 1. A precoding matrix used for two transport streams and four transmit antennas may be shown in Table 2.

TABLE 1

| TPMI index (index) | Codebook W |
|---|---|
| 0 to 2 | $\frac{1}{\sqrt{2}}\begin{bmatrix}1 & 0\\0 & 1\end{bmatrix}$ $\quad$ $\frac{1}{2}\begin{bmatrix}1 & 1\\1 & -1\end{bmatrix}$ $\quad$ $\frac{1}{2}\begin{bmatrix}1 & 1\\j & -j\end{bmatrix}$ |

TABLE 2

| TPMI index | Codebook W |
|---|---|
| 0 to 3 | $\frac{1}{2}\begin{bmatrix}1&0\\0&1\\0&0\\0&0\end{bmatrix}$ $\frac{1}{2}\begin{bmatrix}1&0\\0&0\\0&1\\0&0\end{bmatrix}$ $\frac{1}{2}\begin{bmatrix}1&0\\0&0\\0&0\\0&1\end{bmatrix}$ $\frac{1}{2}\begin{bmatrix}0&0\\1&0\\0&1\\0&0\end{bmatrix}$ |
| 4 to 7 | $\frac{1}{2}\begin{bmatrix}0&0\\1&0\\0&0\\0&1\end{bmatrix}$ $\frac{1}{2}\begin{bmatrix}0&0\\0&0\\1&0\\0&1\end{bmatrix}$ $\frac{1}{2}\begin{bmatrix}1&0\\0&1\\1&0\\0&-j\end{bmatrix}$ $\frac{1}{2}\begin{bmatrix}1&0\\0&1\\1&0\\0&j\end{bmatrix}$ |
| 8 to 11 | $\frac{1}{2}\begin{bmatrix}1&0\\0&1\\-j&0\\0&1\end{bmatrix}$ $\frac{1}{2}\begin{bmatrix}1&0\\0&1\\-j&0\\0&-1\end{bmatrix}$ $\frac{1}{2}\begin{bmatrix}1&0\\0&1\\-1&0\\0&-j\end{bmatrix}$ $\frac{1}{2}\begin{bmatrix}1&0\\0&1\\-1&0\\0&j\end{bmatrix}$ |
| 12 to 15 | $\frac{1}{2}\begin{bmatrix}1&0\\0&1\\j&0\\0&1\end{bmatrix}$ $\frac{1}{2}\begin{bmatrix}1&0\\0&1\\j&0\\0&-1\end{bmatrix}$ $\frac{1}{2\sqrt{2}}\begin{bmatrix}1&1\\1&1\\1&-1\\1&-1\end{bmatrix}$ $\frac{1}{2\sqrt{2}}\begin{bmatrix}1&1\\j&-j\\j&-j\end{bmatrix}$ |
| 20 to 21 | $\frac{1}{2\sqrt{2}}\begin{bmatrix}1&1\\-j&-j\\1&-1\\-j&j\end{bmatrix}$ $\frac{1}{2\sqrt{2}}\begin{bmatrix}1&1\\-j&-j\\j&-j\\1&-1\end{bmatrix}$ $\quad$ — $\quad$ — |

In the codebooks listed in Table 1 and Table 2, if the codebooks corresponding to the TPMI indexes 1 and 2 in Table 1 and the codebooks corresponding to the TPMI indexes 14 to 21 in Table 2 are applied to DFT-s-OFDM, a PAPR feature of DFT-s-OFDM is changed, so that these codebooks cannot be used for DFT-s-OFDM. The codebook corresponding to the TPMI index 0 in Table 1 may be understood as no precoding. In other words, one stream of signal is sent on each of the two transmit antennas. The codebooks corresponding to the TPMI indexes 0 to 5 in Table 2 may be understood as antenna selection. In other words, two transmit antennas are selected from the four transmit antennas, and each of the selected transmit antennas sends one stream of signal. First two rows of the codebooks corresponding to the TPMI indexes 6 to 13 in Table 2 may be understood as no precoding on first two transmit antenna ports. In other words, the first two transmit antenna ports each send one stream of signal, channel time-varying features of a same group of transmit antennas at different time are not matched, and performance improvement is very limited. In conclusion, these multi-stream CP-OFDM codebooks cannot be used for DFT-s-OFDM multi-stream transmission.

The diversity technology is mainly used for MIMO transmission and the like in an open-loop transmission scheme.

Typical transmit diversity schemes include space frequency block code (space frequency block code, SFBC), space time block code (space time block code, STBC), small delay-cyclic delay diversity (small delay-cyclic delay diversity, SD-CDD), and time domain or frequency domain precoding cycling.

Figure 2:
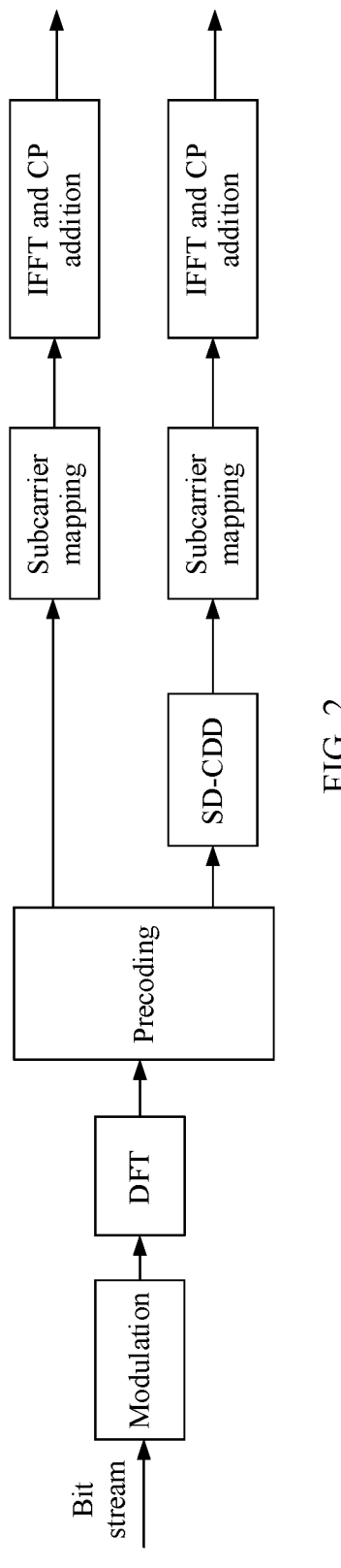
FIG. 2 is a schematic diagram of SC-CDD transmission according to an embodiment of this application.

The SD-CDD can be used in the uplink of the NR. It is assumed that the terminal device has two transmit antennas. The transmit antenna herein is a logical antenna or an intermediate radio frequency link (antennas mentioned below each have the same meaning unless otherwise specified). A specific flowchart of SC-CDD transmission may be shown in FIG. 2: Channel coded bit symbols are scrambled and then modulated. Modulated symbols are grouped (by DFT-s-OFDM, modulated symbols of same DFT-s-OFDM are grouped into one group), a discrete Fourier transform (discrete fourier transform, DFT) operation is performed by group. Frequency domain signals obtained through DFT are precoded and then mapped to two transmit antennas. The SD-CDD is performed on one of the transmit antennas. Then, a transmitter performs operations such as subcarrier mapping, IFFT, and CP addition on the two antennas to generate DFT-s-OFDM symbols.

The SD-CDD obtains diversity by introducing a short delay between a plurality of transmit antennas, so that signals on the plurality of transmit antennas are not transmitted at the same time. The receiver processes the signals on the plurality of transmit antennas as a whole. Therefore, a quantity of multipaths that received signals pass through is significantly greater than that of single transmit antennas. This improves frequency selectivity of a channel, and the receiving end obtains a larger frequency domain diversity gain. In other words, the SD-CDD converts antenna diversity into frequency domain diversity. In addition, because a delay is introduced only to a signal obtained through DFT, the SD-CDD does not affect a PAPR of the signal.

However, a performance gain of the SD-CDD technology depends on a channel condition. When a channel has strong frequency selectivity, the SD-CDD technology obtains a small gain. In addition, demodulation and decoding of the DFT-s-OFDM waveform are performed after inverse discrete Fourier transform (inverse discrete fourier transformation, IDFT) in time domain. A coefficient used for decoding is obtained by averaging frequency domain equalization coefficients in a full bandwidth. Therefore, a gain of increasing frequency selectivity is small. In addition, when a bandwidth is small, frequency selectivity caused by cyclic shift is limited, and it is difficult to obtain a gain. In addition, in the SD-CDD technology, channel multipath is added, and a delay spread of a channel is increased. When the delay spread exceeds a CP range, channel estimation performance deteriorates.

In view of this, embodiments of this application provide a signal transmission method and apparatus, to implement signal transmission by using a multi-stream DFT-s-OFDM waveform. The method and the apparatus are based on a same inventive concept. Because the method and the apparatus use similar problem-resolving principles, mutual reference may be made between implementation of the apparatus and implementation of the method, and no repeated description is provided.

Figures 3, 4:
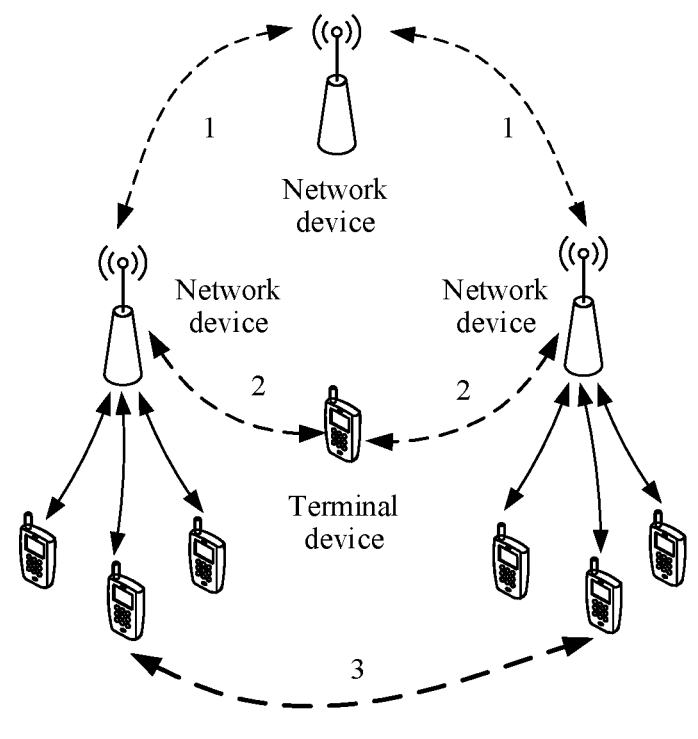
FIG. 3 is a schematic diagram of an application scenario according to an embodiment of this application.
FIG. 4 is a schematic diagram of a structure of a signal transmission apparatus according to an embodiment of this application.

The signal transmission method provided in embodiments of this application may be applied to various communication systems including a transmitting end and a receiving end, for example, an NR system, an LTE system, an LTE-A system, a worldwide interoperability for microwave access (worldwide interoperability for microwave access, WiMAX), a wireless local area network (wireless local area network, WLAN), and a 5G system. Particularly, embodiments of this application are applicable to a scenario in which high-frequency phase noise is severe. Refer to FIG. 3. For example, embodiments of this application is further applicable to the following scenarios: enhanced mobile broadband (enhanced mobile broadband, eMBB) (shown by a solid line in FIG. 3), a backhaul scenario (shown by a dashed line 1 in FIG. 3), device-to-device (device-to-device, D2D) (shown by a dashed line 3 in FIG. 3), multi-station transmission (signal transmission between a same terminal and a plurality of stations) (shown by a dashed line 2 in FIG. 3), and another high-frequency higher-order high-bit-rate scenario.

The signal transmission method provided in embodiments of this application is applicable to any scenario in a network architecture shown in FIG. 3. The method may be performed by two communication apparatuses. For example, the two communication apparatuses may be referred to as a transmitting end and a receiving end. For example, the transmitting end and the receiving end may be two devices in any scenario in FIG. 3, for example, may be a network side device and a terminal side device in the eMBB scenario.

In an example, the transmitting end may be a network side device, and the receiving end may be a terminal side device. The network side device may also be referred to as a network device. The network side device is an entity configured to transmit or receive a signal at a network side, and a device that connects a terminal side device to a wireless network in a communication system, and generally to a core network, for example, a new generation base station (generation NodeB, gNodeB), by using a wired link (for example, an optical fiber cable). The network side device may receive data from the core network and forward the data to a wireless backhaul device, or receive data from the wireless backhaul device and forward the data to the core network. The network device may be a device configured to communicate with a mobile device. The network device may be an AP in a wireless local area network (wireless local area network, WLAN), or an evolved NodeB (evolved NodeB, eNB, or eNodeB) in long term evolution (long term evolution, LTE), or may include a next generation NodeB (next generation NodeB, gNB) in a 5GNR system, a relay station, an access point, a vehicle-mounted device, a wearable device, a network device in a future 5G network, a network device in a future evolved public land mobile network (public land mobile network, PLMN), or a gNodeB/gNB in an NR system. The following uses an example in which the network device is a gNB.

The gNB may include an antenna, a baseband unit (baseband unit, BBU), and a remote radio unit (remote radio unit, RRU). The BBU may be connected to the RRU through a public radio interface (common public radio interface, CPRI), an enhanced CPRI (enhanced CPRI, eCPRI), or the like, and the RRU may be connected to the antenna through a feeder. The antenna may be a passive antenna, the antenna is separated from the RRU, and the antenna may be connected to the RRU by using a cable. Alternatively, the antenna may be an active antenna unit (active antenna unit, AAU), that is, an antenna unit of the AAU and the RRU are integrated together. The AAU implements some physical layer processing functions, radio frequency processing, and a function related to an active antenna.

In some deployments, the gNB may include a central unit (central unit, CU) and a distributed unit (distributed unit, DU). The CU implements some functions of the gNB, and the DU implements some functions of the gNB. For example, the DU may be configured to implement sending/receiving of a radio frequency signal, conversion between a radio frequency signal and a baseband signal, and some baseband processing. The CU may be configured to perform baseband processing, control the base station, and the like. In some embodiments, the CU processes a non-real-time protocol and service, and implements functions of a radio resource control (radio resource control, RRC) layer and a packet data convergence protocol (packet data convergence protocol, PDCP) layer. The DU processes a physical layer protocol and a real-time service, and implements functions of a radio link control (radio link control, RLC) layer, a medium access control (medium access control, MAC) layer, and a physical (physical, PHY) layer. Information at the RRC layer eventually becomes information at the PHY layer, or is converted from information at the PHY layer. Therefore, in this architecture, higher-layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (radio access network, RAN), or the CU may be classified into a network device in a core network (core network, CN). This is not limited in this application.

The terminal side device may also be referred to as a terminal device or a terminal, and may be a wireless terminal device that can receive scheduling and an indication from a network device. The terminal side device may be a device that provides a user with voice and/or data connectivity, a handheld device with a wireless connection function, or another processing device connected to a wireless modem.

The terminal side device may communicate with one or more core networks or the Internet by using a radio access network (for example, a radio access network, RAN), and exchange voice and/or data with the RAN. The terminal side device may include user equipment (user equipment, UE), a wireless terminal device, a mobile terminal device, a device-to-device (device-to-device, D2D) communication terminal device, a V2X terminal device, a machine-to-machine/machine-type communication (machine-to-machine/machine-type communication, M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal may include a mobile phone (also referred to as a "cellular" phone), a computer with a mobile terminal device, or a portable, pocket-sized, handheld, or computer built-in mobile apparatus. For another example, the terminal may include a virtual reality (virtual reality, VR) terminal device, an augmented reality (augmented reality, AR) terminal device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a terminal device in a future evolved public land mobile network (public land mobile network, PLMN), a vehicle device in vehicle to everything (vehicle to everything, V2X), or customer premises equipment (customer premises equipment, CPE). For another example, the terminal may include devices such as a personal communication service (personal communication service, PCS) phone, a cordless telephone set, a session initiation protocol (session initiation protocol, SIP) phone, a wireless local loop (wireless local loop, WLL) station, or a personal digital assistant (personal digital assistant, PDA). Alternatively, the terminal may include a limited device, for example, a device with low power consumption, a device with a limited storage capability, or a device with a limited computing capability. For example, the terminal includes information sensing devices such as a barcode, radio frequency identification (radio frequency identification, RFID), a sensor, a global positioning system (global positioning system, GPS), or a laser scanner.

By way of example, and not limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is a hardware device, and implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that dedicated to only one type of application function and need to collaboratively work with other devices such as smartphones, for example, various smart bands, smart helmets, or smart jewelry for monitoring physical signs. If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (on-board units, OBUs).

In embodiments of this application, the network device and the terminal each may be deployed on land, and include an indoor or outdoor device, or a handheld or vehicle-mounted device; may be deployed on a water surface; or may be deployed on aircraft, a balloon, or a satellite in the air. Application scenarios of the network device and the terminal are not limited in embodiments of this application.

It should be noted that a device for sending a signal is usually referred to as a transmitting end, and a device for receiving a signal is usually referred to as a receiving end. For example, in some embodiments, the transmitting end may be a terminal side device, and the receiving end may be a network side device. In some other embodiments, the transmitting end may be a network side device, and the receiving end may be a terminal side device. For another example, the transmitting end may be two terminal side devices in the D2D scenario in FIG. 3. In other words, the transmitting end is a terminal device, and the receiving end is also a terminal device.

FIG. 4 is a schematic diagram of a structure of a signal transmission apparatus according to an embodiment of this application. The apparatus may be located at a transmitting end or a receiving end. The apparatus may include an input unit, an output unit, and a processor, and may further include a memory. The input unit and the output unit may be an antenna, a transmit antenna port, an antenna array, an antenna element, or the like. Optionally, the input unit and the output unit may be implemented by using a same antenna, transmit antenna port, antenna array, or antenna element.

Figure 5:
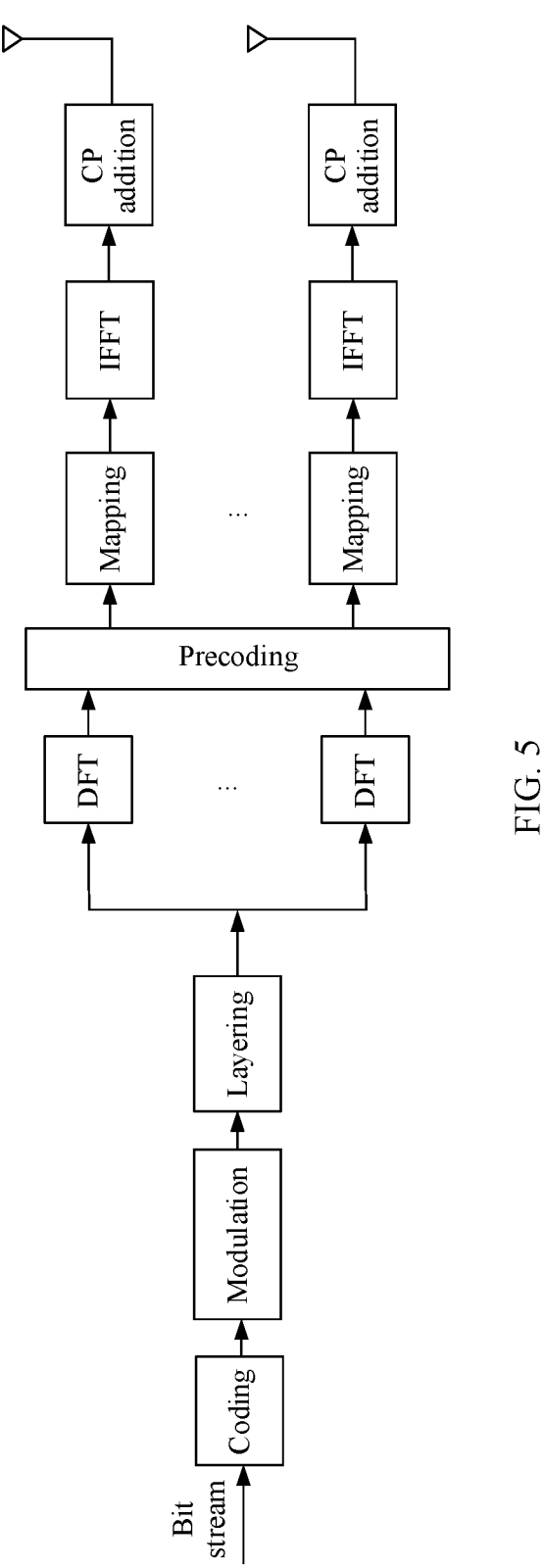
FIG. 5 is a schematic diagram of an information sending procedure according to an embodiment of this application.

As shown in FIG. 5, if the apparatus is located at the transmitting end, the processor may code a to-be-sent data bit stream. Then, the coded data bit stream is modulated according to π/2-BPSK, to obtain a modulated sequence. Then, the modulated sequence is layered to obtain N streams of signals. Then, a DFT operation is performed on the N streams of signals to obtain N streams of signals obtained through DFT. Then, the N streams of signals obtained through DFT are precoded to obtain N1 precoded signals. Then, the N1 precoded signals are mapped to DFT-s-OFDM symbols, IFFT is performed, and a CP is added to obtain final signals. The output unit sends the final signals. N1 is equal to a quantity of transmit antenna ports.

Figure 6:
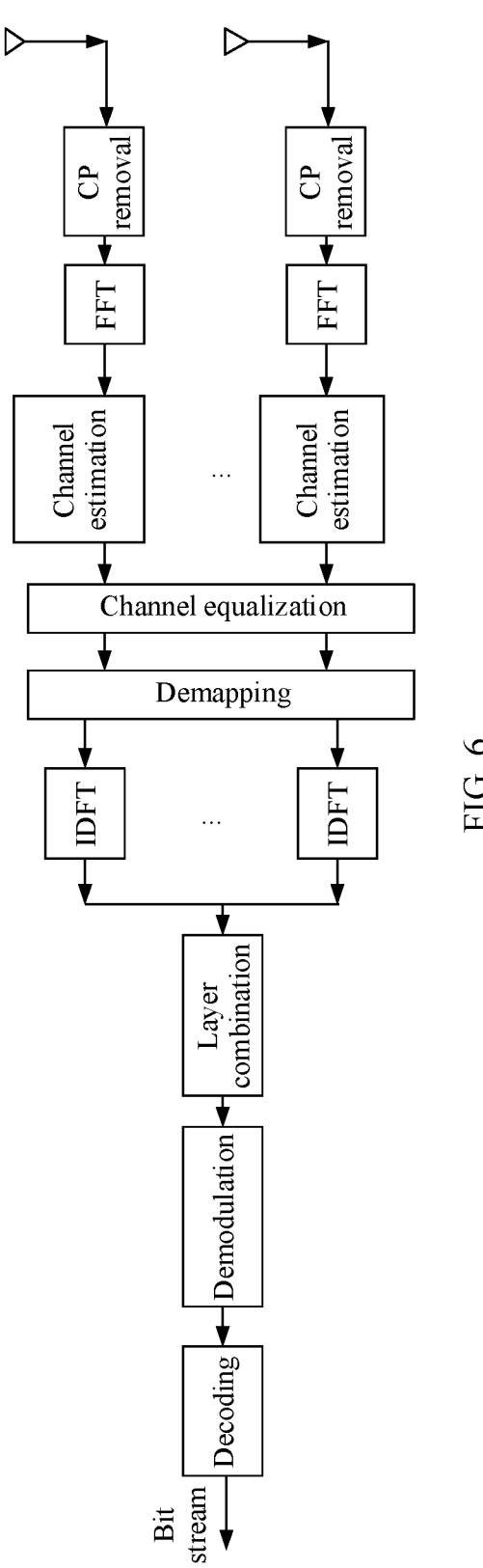
FIG. 6 is a schematic diagram of an information receiving procedure according to an embodiment of this application.

As shown in FIG. 6, if the apparatus is located at the receiving end, the processor may perform an inverse process of the foregoing process. To be specific, after removing a CP added to N2 signals from the N2 signals received by the input unit and separately performing fast Fourier transform (fast fourier transform, FFT), the receiving end separately performs channel estimation in frequency domain, and performs channel equalization on the N2 signals obtained after the channel estimation. Then, the receiving end demaps channel equalized signals, to obtain N streams of signals. An IDFT operation is performed on the demapped N streams of signals separately to obtain N streams of signals obtained through IDFT. Layer combination is performed on the N streams of signals obtained through the IDFT operation to obtain a sequence. The sequence is demodulated and decoded, to recover a data bit stream sent by a transmitting end. N2 is equal to a quantity of receive antenna ports.

A process in which the transmitting end layers the modulated sequence may correspond to a CP-OFDM layer mapping process. In other words, a single-codeword signal is divided into a plurality of layers. A process in which the receiving end performs layer combination on the N streams of signals obtained through the IDFT operation may correspond to a CP-OFDM layer demapping process. In other words, a multi-layer signal is recovered to a received signal measured in codewords, for example, a single-codeword or dual-codeword received signal, to facilitate decoding.

Embodiments of this application mainly relate to a precoding process of a transmitting end, and may further relate to a modulation process of the transmitting end, and a channel equalization process and a demodulation process of a receiving end.

For ease of understanding embodiments of this application, the following describes, in detail with reference to the accompanying drawings, the signal transmission method provided in embodiments of this application. In the following description process, for example, the method is applied to the communication system shown in FIG. 3. In addition, the method may be performed by two communication apparatuses. For example, the two communication apparatuses are respectively a transmitting end and a receiving end. It should be noted that, embodiments of this application merely use the communication system in FIG. 3 as an example, and are not limited to this scenario.

Figure 7:
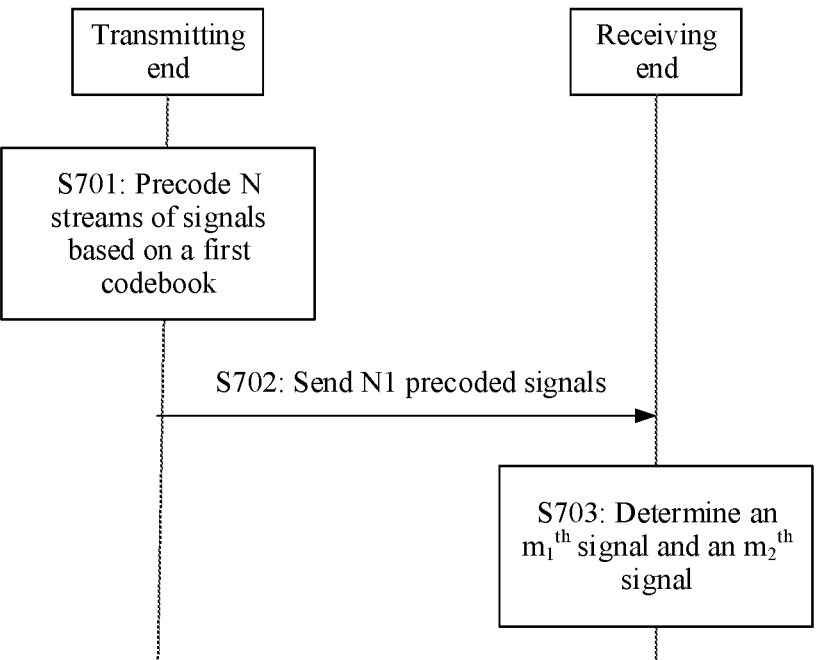
FIG. 7 is a schematic flowchart of a signal transmission method according to an embodiment of this application.

FIG. 7 is a flowchart of a signal transmission method according to an embodiment of this application. A specific process of the method is described as follows:

S701: A transmitting end precodes N streams of signals based on a first codebook, to obtain N1 precoded signals. S701 relates to the precoding process shown in FIG. 5.

A quantity of non-zero elements in each row of the first codebook is 1, and the first codebook causes a phase difference between signals sent on two transmit antenna ports. N and N1 are integers greater than 1. The transmit antenna port may be a logical port.

In an example for description, the transmitting end may be a terminal device, or may be a network device.

Optionally, if the transmitting end is a terminal device, the first codebook may be determined by a network device based on a codebook set and indicated to the terminal device.

If the transmitting end is a network device, the first codebook may be determined by the network device based on a codebook set.

For example, a quantity of non-zero elements in each row of each codebook in the codebook set is 1. Each codebook in the codebook set causes a phase difference between signals sent on two transmit antenna ports. For example, two transmit antenna ports are used as an example, signals on a transmit antenna port 0 and a transmit antenna port 1 are respectively:

$$R_0 = x_0; \text{ and}$$

$$R_1 = x_1 * \exp(1j*\theta), \text{ where}$$

Figure 8:
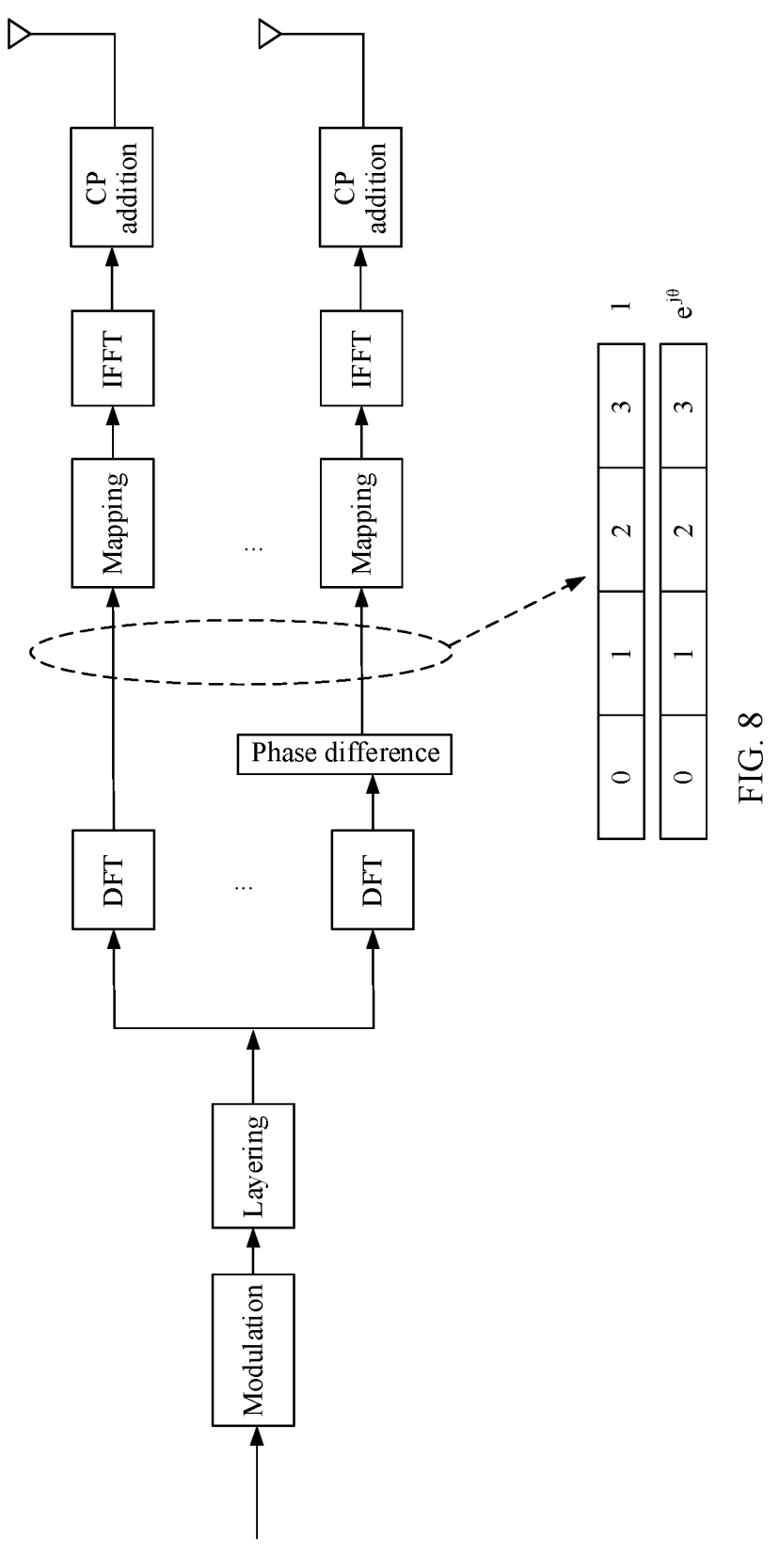
FIG. 8 is a schematic diagram of precoding according to an embodiment of this application.

$x_0$ and $x_1$ are respectively two streams of signals after DFT and before precoding, as shown in FIG. 8.

For example, there may be coherence between transmit antenna ports that send two streams of signals, for example, there is coherence between the transmit antenna port 0 and the transmit antenna port 1. It may also be understood that, the codebook in the codebook set may cause a phase difference between signals sent by two transmit antenna ports having coherence. The phase difference indicates ang $((R_1/x_1)/(R_0/x_0))$, and ang(x) indicates that an angle or a phase is calculated for x.

Optionally, a modulus value of a non-zero element in the codebook may meet a limitation on an antenna transmit power.

In the foregoing design, only one element in each row of each codebook in the codebook set is non-zero, so that a signal output through precoding includes an input signal. Further, the signal output through precoding is linearly scaled of the input signal, thereby not affecting a low PAPR feature of DFT-s-OFDM. In addition, the codebook set provided in this embodiment of this application may be adapted to a time-varying channel between transmit antennas, to implement multi-stream DFT-s-OFDM transmission.

The following describes an example of a codebook set based on which a transmitting end performs precoding. A codebook in the codebook set relates to a quantity of transmit antenna ports of the transmitting end. Specifically, a quantity of rows of the codebook may be equal to the quantity of transmit antenna ports.

In an example for description, it is assumed that there are two transmit antenna ports. Each codebook in the codebook set may be:

$$\frac{1}{\sqrt{2}}\begin{bmatrix} 1 & 0 \\ 0 & e^{j\theta} \end{bmatrix}, \frac{1}{\sqrt{2}}\begin{bmatrix} 0 & 1 \\ e^{j\theta} & 0 \end{bmatrix}, \frac{e^{j\theta_0}}{\sqrt{2}}\begin{bmatrix} 1 & 0 \\ 0 & e^{j\theta} \end{bmatrix},$$

-continued $$\text{or } \frac{e^{j\theta_0}}{\sqrt{2}}\begin{bmatrix} 0 & 1 \\ e^{j\theta} & 0 \end{bmatrix}, \text{ where}$$

$\theta$ is a phase difference between signals sent on the two transmit antenna ports.

$\theta$ may meet the following formula:

$$\theta = \sum_{i=0}^{Q-1} b_i * \frac{\pi}{2^i}, \text{ where}$$

Q is a quantity of phase difference quantization bits, $b_i$ is an $i^{th}$ bit in bits indicating a phase difference, and i={0, 1, 2, . . . , Q−1}. For example, a codebook index may indicate a phase difference, and $b_i$ may be an $i^{th}$ bit of the codebook index. The $i^{th}$ bit may be an $i^{th}$ bit from a least significant bit to a most significant bit, or may be an $i^{th}$ bit from a most significant bit to a least significant bit.

$$\frac{1}{\sqrt{2}}\begin{bmatrix} 1 & 0 \\ 0 & e^{j\theta} \end{bmatrix}$$

is used as an example. If a quantity of phase difference quantization bits is 2, that is, Q is equal to 2, when the codebook index is 00, $$\theta = \sum_{i=0}^{Q-1} b_i * \frac{\pi}{2^i} = 0,$$

and a codebook indicated by the codebook index 00 is $$\frac{1}{\sqrt{2}}\begin{bmatrix} 1 & 0 \\ 0 & 1 \end{bmatrix};$$

when the codebook index is 01, $$\theta = \sum_{i=0}^{Q-1} b_i * \frac{\pi}{2^i} = \pi,$$

and a codebook indicated by the codebook index 01 is $$\frac{1}{\sqrt{2}}\begin{bmatrix} 1 & 0 \\ 0 & -1 \end{bmatrix};$$

when the codebook index is 10, $$\theta = \sum_{i=0}^{Q-1} b_i * \frac{\pi}{2^i} = \frac{\pi}{2},$$

and a codebook indicated by the codebook index 10 is $$\frac{1}{\sqrt{2}}\begin{bmatrix} 1 & 0 \\ 0 & j \end{bmatrix};$$

and when the codebook index is 11, $$\theta = \sum_{i=0}^{Q-1} b_i * \frac{\pi}{2^i} = \frac{3\pi}{2},$$

and a codebook indicated by the codebook index 11 is $$\frac{1}{\sqrt{2}}\begin{bmatrix} 1 & 0 \\ 0 & -j \end{bmatrix},$$

as shown in Table 3.

TABLE 3

| TPMI index | Codebook | | | |
|---|---|---|---|---|
| 0 to 3 | $\frac{1}{\sqrt{2}}\begin{bmatrix} 1 & 0 \\ 0 & 1 \end{bmatrix}$ | $\frac{1}{\sqrt{2}}\begin{bmatrix} 1 & 0 \\ 0 & -1 \end{bmatrix}$ | $\frac{1}{\sqrt{2}}\begin{bmatrix} 1 & 0 \\ 0 & j \end{bmatrix}$ | $\frac{1}{\sqrt{2}}\begin{bmatrix} 1 & 0 \\ 0 & -j \end{bmatrix}$ |

For example, $$\frac{1}{\sqrt{2}}\begin{bmatrix} 1 & 0 \\ 0 & e^{j\theta} \end{bmatrix}$$

and that the $i^{th}$ bit may be the $i^{th}$ bit from a least significant bit to a most significant bit are used as an example. If a quantity of phase difference quantization bits is 3, that is, Q is equal to 3, when the codebook index is 000, $$\theta = \sum_{i=0}^{Q-1} b_i * \frac{\pi}{2^i} = 0,$$

and a codebook indicated by the codebook index 000 is $$\frac{1}{\sqrt{2}}\begin{bmatrix} 1 & 0 \\ 0 & 1 \end{bmatrix};$$

when the codebook index is 001, $$\theta = \sum_{i=0}^{Q-1} b_i * \frac{\pi}{2^i} = \pi,$$

and a codebook indicated by the codebook index 001 is $$\frac{1}{\sqrt{2}}\begin{bmatrix} 1 & 0 \\ 0 & -1 \end{bmatrix};$$

when the codebook index is 010, $$\theta = \sum_{i=0}^{Q-1} b_i * \frac{\pi}{2^i} = \frac{\pi}{2},$$

and a codebook indicated by the codebook index 010 is $$\frac{1}{\sqrt{2}}\begin{bmatrix} 1 & 0 \\ 0 & j \end{bmatrix};$$

when the codebook index is 011, θ=

$$\theta = \sum_{i=0}^{Q-1} b_i * \frac{\pi}{2^i} = \frac{3\pi}{2},$$

and a codebook indicated by the codebook index 011 is $$\frac{1}{\sqrt{2}} \begin{bmatrix} 1 & 0 \\ 0 & -j \end{bmatrix};$$

when the codebook index is 100, $$\theta = \sum_{i=0}^{Q-1} b_i * \frac{\pi}{2^i} = \frac{\pi}{4},$$

and when the codebook index is 111, $$\theta = \sum_{i=0}^{Q-1} b_i * \frac{\pi}{2^i} = \frac{7\pi}{4},$$

and a codebook indicated by the codebook index 111 is $$\frac{1}{\sqrt{2}} \begin{bmatrix} 1 & 0 \\ 0 & \frac{1}{\sqrt{2}} - j\frac{1}{\sqrt{2}} \end{bmatrix};$$

as shown in Table 4.

TABLE 4

| TPMI index | Codebook | | | |
|---|---|---|---|---|
| 0 to 3 | $\frac{1}{\sqrt{2}} \begin{bmatrix} 1 & 0 \\ 0 & 1 \end{bmatrix}$ | $\frac{1}{\sqrt{2}} \begin{bmatrix} 1 & 0 \\ 0 & -1 \end{bmatrix}$ | $\frac{1}{\sqrt{2}} \begin{bmatrix} 1 & 0 \\ 0 & j \end{bmatrix}$ | $\frac{1}{\sqrt{2}} \begin{bmatrix} 1 & 0 \\ 0 & -j \end{bmatrix}$ |
| 4 to 7 | $\frac{1}{\sqrt{2}} \begin{bmatrix} 1 & 0 \\ 0 & \frac{1}{\sqrt{2}} + j\frac{1}{\sqrt{2}} \end{bmatrix}$ | $\frac{1}{\sqrt{2}} \begin{bmatrix} 1 & 0 \\ 0 & -\frac{1}{\sqrt{2}} - j\frac{1}{\sqrt{2}} \end{bmatrix}$ | $\frac{1}{\sqrt{2}} \begin{bmatrix} 1 & 0 \\ 0 & -\frac{1}{\sqrt{2}} + j\frac{1}{\sqrt{2}} \end{bmatrix}$ | $\frac{1}{\sqrt{2}} \begin{bmatrix} 1 & 0 \\ 0 & \frac{1}{\sqrt{2}} - j\frac{1}{\sqrt{2}} \end{bmatrix}$ | and a codebook indicated by the codebook index 100 is $$\frac{1}{\sqrt{2}} \begin{bmatrix} 1 & 0 \\ 0 & \frac{1}{\sqrt{2}} + j\frac{1}{\sqrt{2}} \end{bmatrix};$$

when the codebook index is 101, $$\theta = \sum_{i=0}^{Q-1} b_i * \frac{\pi}{2^i} = \frac{5\pi}{4},$$

and a codebook indicated by the codebook index 101 is $$\frac{1}{\sqrt{2}} \begin{bmatrix} 1 & 0 \\ 0 & -\frac{1}{\sqrt{2}} - j\frac{1}{\sqrt{2}} \end{bmatrix};$$

when the codebook index is 110, $$\theta = \sum_{i=0}^{Q-1} b_i * \frac{\pi}{2^i} = \frac{3\pi}{4},$$

and a codebook indicated by the codebook index 110 is $$\frac{1}{\sqrt{2}} \begin{bmatrix} 1 & 0 \\ 0 & -\frac{1}{\sqrt{2}} + j\frac{1}{\sqrt{2}} \end{bmatrix};$$

It should be understood that the foregoing two examples are merely examples for description, and do not limit a correspondence between a codebook index and a codebook. For example, the correspondence may be alternatively $$\theta = \sum_{i=0}^{Q-1} b_i * \frac{\pi}{2^i} = \pi.$$

In a possible implementation, the quantity Q of phase difference quantization bits may be reported to the network device as one of capabilities of the terminal device. The network device may determine a quantity of bits of the codebook index based on capability information reported by the terminal device.

Based on the foregoing solution, indication information of TPMI indexes under different quantization bits may be shared. For example, the codebooks indicated by the indexes 0 to 3 in the codebook set shown in Table 3 may be shared with the codebooks indicated by the indexes 0 to 3 in the codebook set shown in Table 4.

It may be understood that a codebook set designed based on $$\frac{1}{\sqrt{2}} \begin{bmatrix} 0 & 1 \\ e^{j\theta} & 0 \end{bmatrix}, \frac{e^{j\theta_0}}{\sqrt{2}} \begin{bmatrix} 1 & 0 \\ 0 & e^{j\theta} \end{bmatrix}, \text{ or } \frac{e^{j\theta_0}}{\sqrt{2}} \begin{bmatrix} 0 & 1 \\ e^{j\theta} & 0 \end{bmatrix}$$

21 is similar to a codebook set designed based on $$\frac{1}{\sqrt{2}}\begin{bmatrix} 1 & 0 \\ 0 & e^{j\theta} \end{bmatrix}.$$

For details, refer to the foregoing description, and no repeated description is provided.

Optionally, if a codebook set is designed based on $$\frac{e^{j\theta_0}}{\sqrt{2}}\begin{bmatrix} 1 & 0 \\ 0 & e^{j\theta} \end{bmatrix} \text{ or } \frac{e^{j\theta_0}}{\sqrt{2}}\begin{bmatrix} 0 & 1 \\ e^{j\theta} & 0 \end{bmatrix}, \text{ a}$$

codebook in the codebook set may be indicated in two parts. One part indicates $\theta$. For details, refer to the description about $\theta$ in the foregoing description. Another part indicates $\theta_0$, where a value of $\theta_0$ may be configured by using different signaling. For example, a configuration period is longer than a codebook configuration period, and may be configured by using radio resource control (radio resource control, RRC) or a medium access control channel element (medium access channel control element, MAC CE).

Optionally, different $\theta_0$ may be introduced between transmitting ends. In other words, different transmitting ends may correspond to different $\theta_0$. This may randomize interference of a receiving end between a plurality of transmitting ends. Alternatively, different $\theta_0$ is introduced between cells. This may randomize inter-cell interference.

Figure 9:
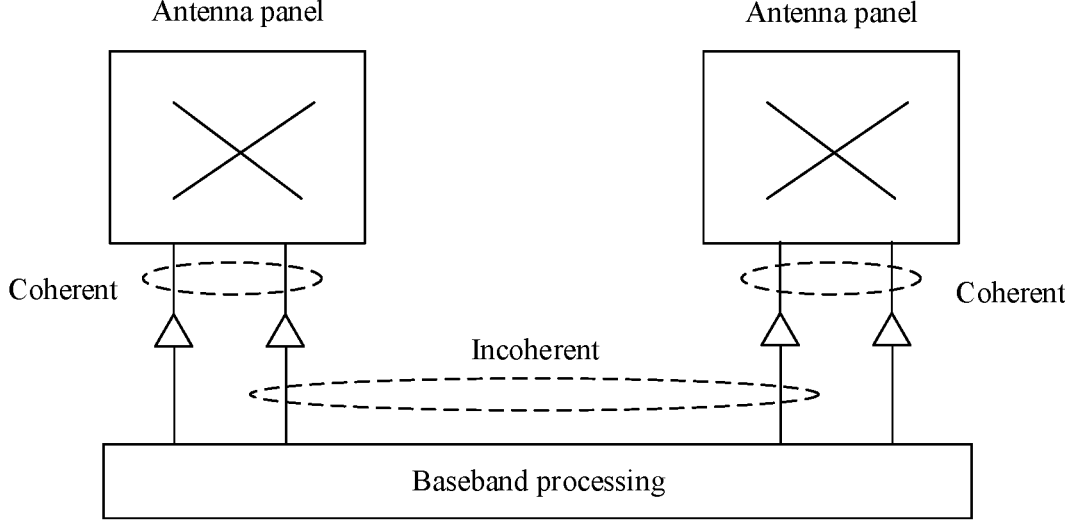
FIG. 9 is a schematic diagram of antenna panel deployment according to an embodiment of this application.

In another example for description, it is assumed that there are four transmit antenna ports. During codebook design and/or codebook selection, a codebook may be designed and/or selected based on coherence between transmit antenna ports. For example, coherence between antennas may be as follows: Four antennas are distributed on two antenna panels, the antennas between the panels are incoherent with each other, and the antennas in the panels are coherent, as shown in FIG. 9.

For example, the coherence between the four transmit antenna ports may be classified into: all transmit antenna ports are coherent; transmit antenna ports {0, 1} are coherent, and transmit antenna ports {2, 3} are coherent; transmit antenna ports {0, 2} are coherent, and transmit antenna ports {1, 3} are coherent; and all transmit antenna ports are incoherent. Optionally, specific coherence may be reported by the terminal device, or the network device side determines the coherence based on an uplink channel and sends determined coherence to the terminal device.

In a possible implementation, the terminal device may report coherence between transmit antenna ports based on 2-bit indication information. Alternatively, the network device indicates the coherence between the transmit antenna ports based on 2-bit indication information. For example, the indication information may be shown in Table 5.

TABLE 5

| Indication information | 00 | 01 | 10 | 11 |
|---|---|---|---|---|
| Coherence between antennas | All antennas are coherent | Antennas {0, 1} are coherent, and antennas {2, 3} are coherent | Antennas {0, 2} are coherent, and antennas {1, 3} are coherent | All antennas are incoherent/Reserved |

22

It should be understood that Table 5 is merely an example for description, and does not limit a correspondence between a quantity of bits, a value, and indication content of the indication information.

The following describes an example of a process of designing a codebook based on antenna coherence.

For example, the codebook in the codebook set may be:

$$e^{j\theta_0}\begin{bmatrix} 1 & 0 & e^{j\theta_2} & 0 \\ 0 & e^{j\theta_1} & 0 & e^{j\theta_3} \end{bmatrix}^T \text{ or } e^{j\theta_0}\begin{bmatrix} 1 & e^{j\theta_1} & 0 & 0 \\ 0 & 0 & e^{j\theta_2} & e^{j\theta_3} \end{bmatrix}^T.$$

T indicates a transpose, and $e^{j\theta_1}$ is a phase difference between a second transmit antenna port and a first transmit antenna port. $e^{j\theta_2}$ is a phase difference between a third transmit antenna port and the first transmit antenna port. $e^{j\theta_3}$ is a phase difference between a fourth transmit antenna port and the first transmit antenna port. $e^{j\theta_2}$ is a phase difference between the third transmit antenna port and the first transmit antenna port.

When all transmit antenna ports are coherent, for details about $\theta_1$, $\theta_2$, and $\theta_3$, refer to descriptions about $\theta$ in the example in which there are two transmit antenna ports. Details are not described herein again.

When some transmit antenna ports are coherent, for example, four transmit antenna ports are divided into two groups, each group includes two transmit antenna ports, transmit antenna ports in a group have coherence, and transmit antenna ports in different groups do not have coherence. $\theta$ of one of the two transmit antenna ports having coherence may be 0, and for $\theta$ of the other transmit antenna port, refer to the description about $\theta$ in the example in which there are two transmit antenna ports. For example, when there are two phase difference quantization bits, for $\theta$ of the other transmit antenna port, refer to $\theta$ in Table 3. When there are three phase difference quantization bits, for $\theta$ of the other transmit antenna port, refer to $\theta$ in Table 4.

In an example, antennas {0, 1} are coherent, and antennas {2, 3} are coherent. Codebooks of the antennas {0, 1} and codebooks of the antennas {2, 3} may be selected independently. It is assumed that the quantity Q of phase difference quantization bits is 2, the codebook set may be shown in Table 6.

TABLE 6

| TPMI index | Codebook | | | |
|---|---|---|---|---|
| 0 to 3 | $\frac{1}{\sqrt{2}}\begin{bmatrix} 1 & 0 \\ 0 & 1 \\ 1 & 0 \\ 0 & 1 \end{bmatrix}$ | $\frac{1}{\sqrt{2}}\begin{bmatrix} 1 & 0 \\ 0 & 1 \\ 1 & 0 \\ 0 & -1 \end{bmatrix}$ | $\frac{1}{\sqrt{2}}\begin{bmatrix} 1 & 0 \\ 0 & 1 \\ 1 & 0 \\ 0 & j \end{bmatrix}$ | $\frac{1}{\sqrt{2}}\begin{bmatrix} 1 & 0 \\ 0 & 1 \\ 1 & 0 \\ 0 & -j \end{bmatrix}$ |
| 4 to 7 | $\frac{1}{\sqrt{2}}\begin{bmatrix} 1 & 0 \\ 0 & -1 \\ 1 & 0 \\ 0 & 1 \end{bmatrix}$ | $\frac{1}{\sqrt{2}}\begin{bmatrix} 1 & 0 \\ 0 & -1 \\ 1 & 0 \\ 0 & -1 \end{bmatrix}$ | $\frac{1}{\sqrt{2}}\begin{bmatrix} 1 & 0 \\ 0 & -1 \\ 1 & 0 \\ 0 & j \end{bmatrix}$ | $\frac{1}{\sqrt{2}}\begin{bmatrix} 1 & 0 \\ 0 & -1 \\ 1 & 0 \\ 0 & -j \end{bmatrix}$ |
| 8 to 11 | $\frac{1}{\sqrt{2}}\begin{bmatrix} 1 & 0 \\ 0 & j \\ 1 & 0 \\ 0 & 1 \end{bmatrix}$ | $\frac{1}{\sqrt{2}}\begin{bmatrix} 1 & 0 \\ 0 & j \\ 1 & 0 \\ 0 & -1 \end{bmatrix}$ | $\frac{1}{\sqrt{2}}\begin{bmatrix} 1 & 0 \\ 0 & j \\ 1 & 0 \\ 0 & j \end{bmatrix}$ | $\frac{1}{\sqrt{2}}\begin{bmatrix} 1 & 0 \\ 0 & j \\ 1 & 0 \\ 0 & -j \end{bmatrix}$ |

TABLE 6-continued

| TPMI index | Codebook |
|---|---|
| 12 to 15 | $\frac{1}{\sqrt{2}}\begin{bmatrix}1 & 0\\0 & -j\\1 & 0\\0 & 1\end{bmatrix}$ $\frac{1}{\sqrt{2}}\begin{bmatrix}1 & 0\\0 & -j\\1 & 0\\0 & -1\end{bmatrix}$ $\frac{1}{\sqrt{2}}\begin{bmatrix}1 & 0\\0 & -j\\1 & 0\\0 & j\end{bmatrix}$ $\frac{1}{\sqrt{2}}\begin{bmatrix}1 & 0\\0 & -j\\1 & 0\\0 & -j\end{bmatrix}$ |

In another example, antennas {0, 2} are coherent, and antennas {1, 3} are coherent. Codebooks of the antennas {0, 2} and codebooks of the antennas {1, 3} may be selected independently. It is assumed that the quantity Q of phase difference quantization bits is 2, the codebook set may be shown in Table 7.

TABLE 7

| TPMI index | Codebook |
|---|---|
| 0 to 3 | $\frac{1}{\sqrt{2}}\begin{bmatrix}1 & 0\\1 & 0\\0 & 1\\0 & 1\end{bmatrix}$ $\frac{1}{\sqrt{2}}\begin{bmatrix}1 & 0\\1 & 0\\0 & 1\\0 & -1\end{bmatrix}$ $\frac{1}{\sqrt{2}}\begin{bmatrix}1 & 0\\1 & 0\\0 & 1\\0 & j\end{bmatrix}$ $\frac{1}{\sqrt{2}}\begin{bmatrix}1 & 0\\1 & 0\\0 & 1\\0 & -j\end{bmatrix}$ |
| 4 to 7 | $\frac{1}{\sqrt{2}}\begin{bmatrix}1 & 0\\1 & 0\\0 & -1\\0 & 1\end{bmatrix}$ $\frac{1}{\sqrt{2}}\begin{bmatrix}1 & 0\\1 & 0\\0 & -1\\0 & -1\end{bmatrix}$ $\frac{1}{\sqrt{2}}\begin{bmatrix}1 & 0\\1 & 0\\0 & -1\\0 & j\end{bmatrix}$ $\frac{1}{\sqrt{2}}\begin{bmatrix}1 & 0\\1 & 0\\0 & -1\\0 & -j\end{bmatrix}$ |
| 8 to 11 | $\frac{1}{\sqrt{2}}\begin{bmatrix}1 & 0\\1 & 0\\0 & j\\0 & 1\end{bmatrix}$ $\frac{1}{\sqrt{2}}\begin{bmatrix}1 & 0\\1 & 0\\0 & j\\0 & -1\end{bmatrix}$ $\frac{1}{\sqrt{2}}\begin{bmatrix}1 & 0\\1 & 0\\0 & j\\0 & j\end{bmatrix}$ $\frac{1}{\sqrt{2}}\begin{bmatrix}1 & 0\\1 & 0\\0 & j\\0 & -j\end{bmatrix}$ |
| 12 to 15 | $\frac{1}{\sqrt{2}}\begin{bmatrix}1 & 0\\1 & 0\\0 & -j\\0 & 1\end{bmatrix}$ $\frac{1}{\sqrt{2}}\begin{bmatrix}1 & 0\\1 & 0\\0 & -j\\0 & -1\end{bmatrix}$ $\frac{1}{\sqrt{2}}\begin{bmatrix}1 & 0\\1 & 0\\0 & -j\\0 & j\end{bmatrix}$ $\frac{1}{\sqrt{2}}\begin{bmatrix}1 & 0\\1 & 0\\0 & -j\\0 & -j\end{bmatrix}$ |

It should be understood that Table 6 or Table 7 is merely an example for description, and does not limit a correspondence between a codebook index and a codebook.

When all transmit antenna ports are incoherent, for example, all four transmit antenna ports are incoherent, $\theta_i=0$, and i=1, 2, or 3.

In a possible implementation, before precoding the N streams of signals based on the first codebook, the transmitting end may modulate a to-be-sent bit according to a modulation scheme corresponding to a first modulation and coding scheme (modulation and coding scheme, MCS) index. The modulation scheme corresponding to the first MCS index is $\pi/2$-BPSK. Then, layer mapping is performed on a modulated to-be-sent bit, to obtain the N streams of signals.

The modulation scheme may be determined based on a preset MCS table. The MCS table includes a plurality of MCS indexes. A bit rate corresponding to a largest MCS index corresponding to the $\pi/2$-BPSK modulation scheme is greater than 314.

For example, the MCS table includes a plurality of MCS indexes, and modulation orders indicated by the plurality of MCS indexes may be dynamically configured. For example, the modulation orders indicated by the plurality of MCS indexes are q. When q has different values, different modulation schemes may be indicated, and target bit rates may correspond to different target bit rates based on values of q.

For example, when a modulation scheme indicated by an MCS index is determined by q, if q is 1, the modulation scheme indicated by the MCS index is $\pi/2$-BPSK, and a corresponding target bit rate may be P/q. A value of P may be greater than 314. If q is 2, the modulation scheme indicated by the MCS index is QPSK.

In an example, the MCS table may be shown in Table 8. When the MCS index is 0 to 5 and q=1, the modulation scheme indicated by the MCS index is pi/2-BPSK; or when q=2, the modulation scheme indicated by the MCS index is QSPK.

TABLE 8

| MCS index | Modulation order | Target bit rate * 1024 | Spectral efficiency |
|---|---|---|---|
| 0 | q | 240/q | 0.2344 |
| 1 | q | 314/q | 0.3066 |
| 2 | q | 193*2/q | 0.3770 |
| 3 | q | 251*2/q | 0.4902 |
| 4 | q | 308*2/q | 0.6016 |
| 5 | q | 379*2/q | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| . . . | . . . | . . . | . . . |

It should be understood that content included in the MCS table is not limited to content shown in Table 8. Table 8 is merely an example for description. Content included in the MCS table is not specifically limited in this embodiment of this application.

In the foregoing manner, the MCS table is expanded, so that the $\pi/2$-BPSK can correspond to a higher target bit rate, to achieve higher spectral efficiency. In this way, the transmitting end can achieve a higher target bit rate and higher spectral efficiency when the $\pi/2$-BPSK is selected for modulation, to improve demodulation performance without affecting a low PAPR feature.

S702: The transmitting end sends the N1 precoded signals. Correspondingly, the receiving end receives signals obtained after the N1 precoded signals are transmitted through the channel. Specifically, the receiving end may receive, on M subcarriers, N2 signals obtained after the N1 precoded signals are transmitted through the channel. M is a quantity of subcarriers included in a scheduling bandwidth, that is, a quantity of DFT points or a DFT size, or a quantity of $\pi/2$-BP SK modulation symbols.

S703: The receiving end determines an $m_1{}^{th}$ signal and an $m_2{}^{th}$ signal. S703 relates to the channel equalization process shown in FIG. 6.

The $m_1{}^{th}$ signal is determined based on an $m_1{}^{th}$ received signal and an $m_2{}^{th}$ received signal. The $m_2{}^{th}$ signal is determined based on the $m_1{}^{th}$ received signal and the $m_2{}^{th}$ received signal. Alternatively, the $m_2{}^{th}$ signal may be determined based on the $m_1{}^{th}$ signal. The $m_1{}^{th}$ signal is equal to a complex conjugate of the $m_2{}^{th}$ signal.

The $m_1{}^{th}$ received signal is a signal received on an $m_1{}^{th}$ subcarrier in the M subcarriers. The $m_2{}^{th}$ received signal is a signal received on an $m_2{}^{th}$ subcarrier in the M subcarriers. The $m_1{}^{th}$ signal is a signal recovered on the $m_1{}^{th}$ subcarrier. The $m_2{}^{th}$ signal is a signal recovered on the $m_2{}^{th}$ subcarrier. In the following, an $A{}^{th}$ received signal is a signal received on a subcarrier numbered A, and an $A{}^{th}$ signal is a signal recovered on the subcarrier numbered A. Subcarriers are numbered from 0 to M−1. Details are not described in the following.

It may be understood that the signal recovered on the $m_1{}^{th}$ subcarrier (or the $m_2{}^{th}$ subcarrier) may be understood as a signal recovered by the receiving end on the $m_1{}^{th}$ subcarrier (or the $m_2{}^{th}$ subcarrier) based on a received signal. The signal corresponds to a signal sent by the transmitting end on the $m_1{}^{th}$ subcarrier (or the $m_2{}^{th}$ subcarrier), or may be understood as that the signal is a signal recovered from a signal sent by the transmitting end on the $m_1{}^{th}$ subcarrier (or the $m_2{}^{th}$ subcarrier).

In the foregoing channel equalization, the receiving end combines, based on a feature of a π/2-BPSK signal in frequency domain, received signals, channels, and the like that correspond to conjugate symmetric subcarriers, to expand dimensions of the received signals and the channels, thereby improving an interference suppression capability.

Figure 10:
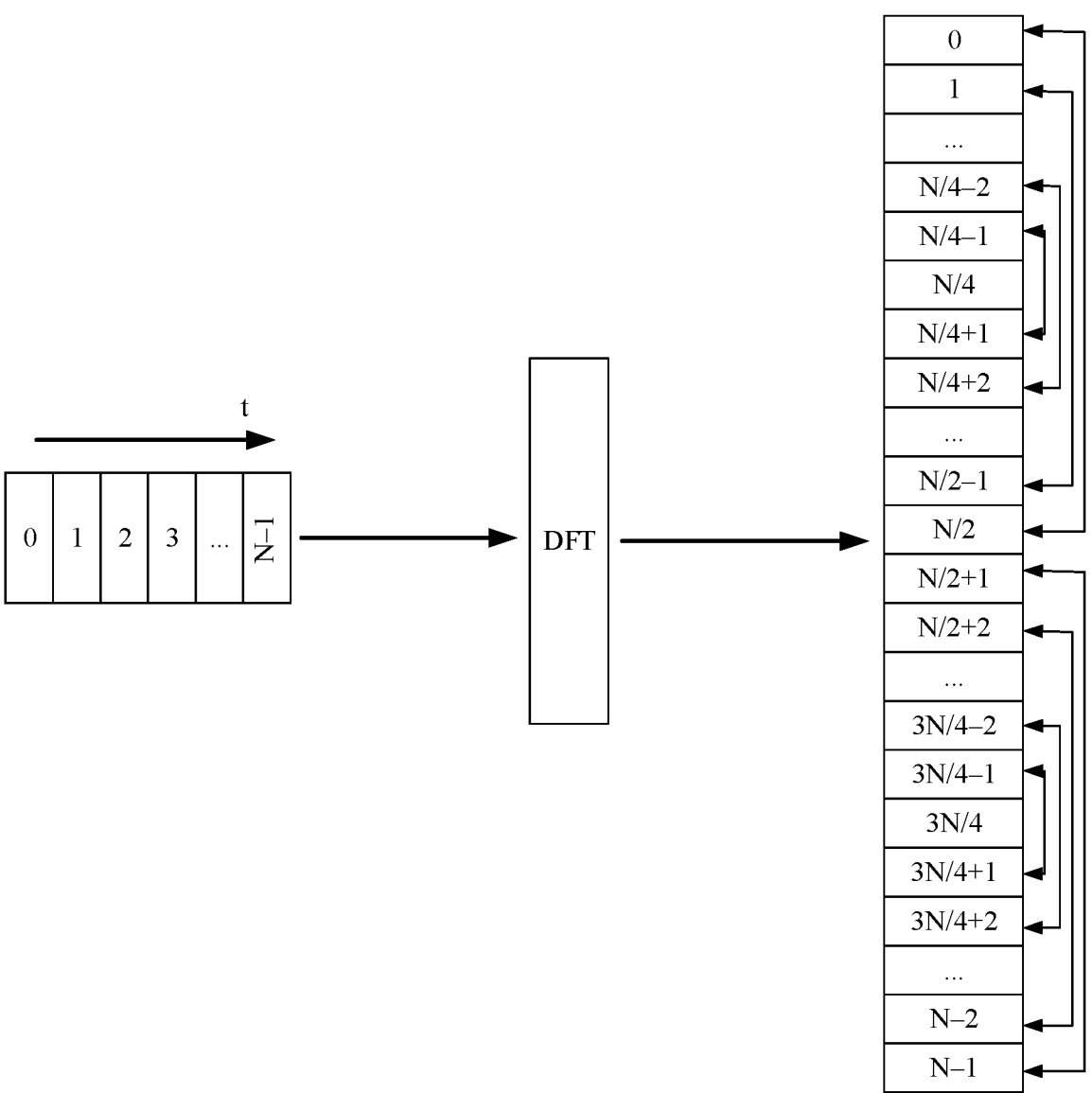
FIG. 10 is a schematic diagram of a signal conjugate symmetric relationship according to an embodiment of this application.

Optionally, the signals received by the receiving end are conjugate symmetric about a symmetry point in frequency domain. For example, the signals received by the receiving end may have two symmetry points in frequency domain: M/4 and 3 M/4, which may be understood as an M/4$^{th}$ signal and a 3 M/4$^{th}$ signal. Signals on two sides of the symmetry point are equal to a complex conjugate of each other. For example, as shown in FIG. 10, signals connected to a same arrow are equal to a complex conjugate of each other. For example, a conjugate equality relationship between a 0$^{th}$ signal to an (M−1)$^{th}$ signal may meet the following formula:

$$d_m = d^*_{\frac{M}{2}-m}, \text{ and } m = 0, \dots, \text{ or } \frac{M}{4} - 1 \text{ or } d_m = d^*_{\frac{3M}{2}-m},$$

$$\text{and } m = \frac{M}{2} + 1, \dots, \text{ or } \frac{3M}{4} - 1.$$

Therefore, a relationship between $m_1$ and $m_2$ may be:
When $$m_1 = \left\{0, \dots, \frac{M}{4} - 1\right\}, m_2 = \frac{M}{2} - m_1;$$

and
when $$m_1 = \left\{\frac{M}{2} + 1, \dots, \frac{3M}{4} - 1\right\}, m_2 = \frac{3M}{2} - m_1.$$

For example, the $m_1{}^{th}$ received signal, the $m_2{}^{th}$ received signal, and a sent signal corresponding to the $m_1{}^{th}$ signal meet the following formula relationship:

$$Y_{m1} = \begin{bmatrix} h_{m_1} \\ h^*_{m_2} \end{bmatrix} d_{m1} + n_{m1}, \text{ where } Y_{m1} = \begin{bmatrix} y_{m_1} \\ y^*_{m_2} \end{bmatrix}, y_{m_1}$$

is the $m_1{}^{th}$ received signal, and a dimension is $N_{rx}*1$. $y_{m_2}*$ is the $m_2{}^{th}$ received signal, a dimension is $N_{rx}*1$, and $N_{rx}$ is a quantity of receive antennas. $h_{m_1}$ is an equivalent channel of the $m_1{}^{th}$ subcarrier, and a dimension is $N_{rx}*N$, where N is a quantity of streams of signals, that is, $h_{m_1} = \tilde{h}_{m_1}*W$. $\tilde{h}_{m_1}$ is a channel between a transmit antenna and a receive antenna, and a dimension is $N_{rx}*N_{tx}$. $N_{tx}$ is a quantity of transmit antenna ports, and W is a codebook indicated by the TPMI described above. $h_{m_2}$ is an equivalent channel of the $m_2{}^{th}$ subcarrier, and a dimension is $N_{rx}*N$, that is, $h_{m_2} = \tilde{h}_{m_2}*W$. $\tilde{h}_{m_2}$ is an original channel between a transmit antenna and a receive antenna, and a dimension is $N_{rx}* N_{tx}$. $N_{tx}$ is a quantity of transmit antenna ports, and $\tilde{W}$ is a codebook indicated by the TPMI described above. $d_{m_1}$ is a sent signal corresponding to the $m_1{}^{th}$ signal, and a dimension is $N*1$. $n_{m1}$ is a noise signal on the $m_1{}^{th}$ subcarrier, and a dimension is $N_{rx}*1$.

The receiving end may determine the $m_1{}^{th}$ signal $\hat{d}_{m1}$ based on the $m_1{}^{th}$ received signal, the $m_2{}^{th}$ received signal, and the foregoing formula relationship.

Optionally, the $m_1{}^{th}$ received signal, the $m_2{}^{th}$ received signal, and a sent signal corresponding to the $m_2{}^{th}$ signal meet the following formula relationship:

$$Y_{m2} = \begin{bmatrix} h_{m_2} \\ h^*_{m_1} \end{bmatrix} d_{m2} + n_{m2}, \text{ where } Y_{m2} = \begin{bmatrix} y_{m_2} \\ y^*_{m_1} \end{bmatrix},$$

$d_{m2}$ is the $m_2{}^{th}$ received signal, and a dimension is $N*1$. $n_{m2}$ is a noise signal on the $m_2{}^{th}$ subcarrier, and a dimension is $N_{rx}*1$.

The receiving end may determine the $m_2{}^{th}$ signal d $m_2$ based on the $m_1{}^{th}$ received signal, the $m_2{}^{th}$ received signal, and the foregoing formula relationship.

Alternatively, the $m_2{}^{th}$ signal may also be determined based on the $m_1{}^{th}$ signal, for example, $\hat{d}_{m2} = conj(\hat{d}_{m1})$, where conj( ) indicates calculation of a conjugate.

The foregoing channel equalization manner can improve an interference suppression dimension, better reduce impact of interference and/or noise on the signals, and improve demodulation performance.

In this embodiment of this application, the transmitting end introduces a phase offset between the two transmit antenna ports in a precoding process, and the receiving end determines a sent signal on a corresponding subcarrier based on both two signals having a conjugate equality relationship in the channel equalization process, so that without increasing the PAPR of the DFT-s-OFDM, equivalent inter-stream interference is optimal after channel equalization is performed at the receiving end, to improve demodulation performance of the receiving end.

In a possible implementation, the transmitting end may modulate the to-be-sent bit through π/2-BPSK modulation that meets the following formula:

$$b(k) = e^{j\frac{\pi}{2}(l \bmod 2)}(1 - 2a(k)).$$

Alternatively, the pi/2-BPSK meets the following formula:

$$b(k) = \frac{e^{-j\frac{\pi}{4}}e^{j\frac{\pi}{2}(k \bmod 2)}}{\sqrt{2}}[(1 - 2a(k)) + j(1 - 2a(k))].$$

Alternatively, the pi/2-BPSK meets the following formula:

$$b(k) = \frac{e^{+j\frac{\pi}{4}}e^{j\frac{\pi}{2}(k \bmod 2)}}{\sqrt{2}}[(1 - 2a(k)) + j(1 - 2a(k))], \text{ where}$$

a(k) is a $k^{th}$ bit of the to-be-sent bit, b(k) is a modulation symbol corresponding to the $k^{th}$ bit, and k is an integer greater than 0 or equal to 0.

Figure 11:
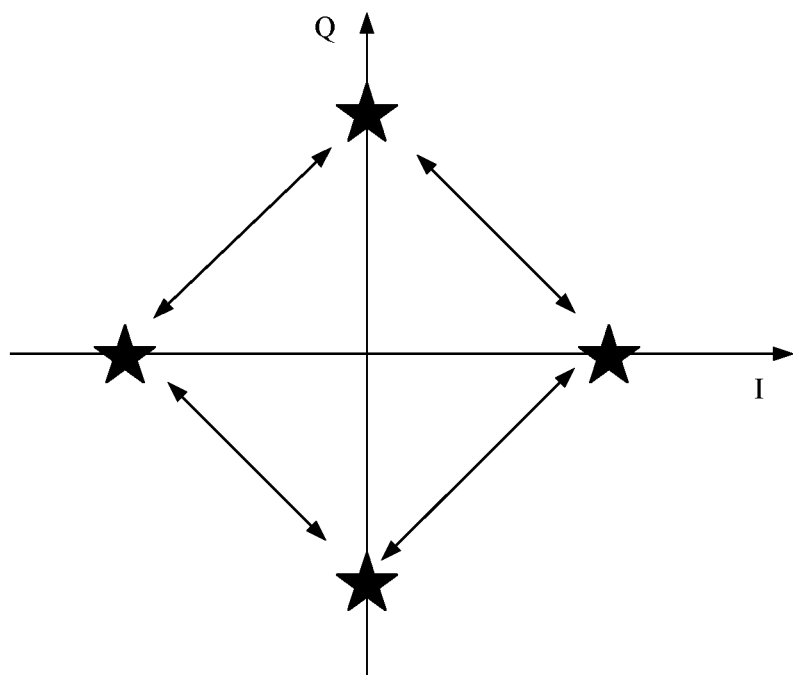
FIG. 11 is a schematic diagram of a constellation point according to an embodiment of this application.

Constellation points of π/2-BPSK that meet the foregoing formula are shown in FIG. 11. Signals generated based on the constellation points are conjugate symmetric in frequency domain.

It should be understood that the transmitting end is not limited to performing modulation according to the foregoing formula, and may alternatively perform modulation according to a variation of the foregoing formula, provided that the transmitting end and the receiving end have a consistent understanding of the modulation manner.

In a scenario in which a multi-stream (or multi-layer) signal is sent, $$e^{j\frac{\pi}{2}(k \bmod 2)}$$

in the foregoing formula may be adjusted to $$e^{j\frac{\pi}{2}\left(floor\left(\frac{1}{N}\right) \bmod 2\right)},$$

where N is a quantity of streams or a quantity of layers, and floor(x) indicates rounding down x.

Figure 12:
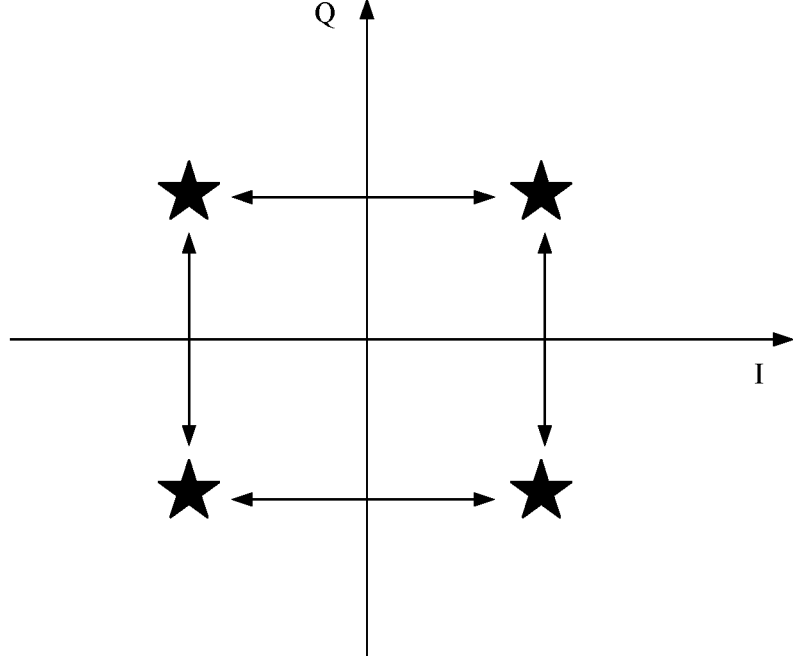
FIG. 12 is a schematic diagram of another constellation point according to an embodiment of this application.

Constellation points of existing π/2-BPSK modulated signals are shown in FIG. 12. Signals generated based on the constellation points are not conjugate symmetric about a symmetry point in frequency domain. In the foregoing implementation, the transmitting end performs phase shift on the signals by π/4 in a π/2-BPSK modulation process, so that the signals obtained through π/2-BPSK modulation are conjugate symmetric in frequency domain. Therefore, the receiving end may determine a sent signal based on both two conjugate symmetric signals, to improve an interference suppression dimension, better reduce impact of interference and/or noise on the signals, and improve demodulation performance.

Optionally, the transmitting end may flexibly select a π/2-BPSK modulation scheme. For example, the transmitting end selects the π/2-BPSK modulation scheme based on a quantity of DFT-s-OFDM streams, a single-stream DFT-s-OFDM uses a modulation scheme in an existing protocol. A multi-stream DFT-s-OFDM may use the π/2-BPSK modulation scheme provided in this embodiment of this application. For another example, a version number on which the MCS table is based may be indicated by using RRC signaling. If the version number is a first version, a π/2-BPSK modulation scheme in a conventional technology may be used. If the version number is a second version or the version number is not the first version, a π/2-BPSK modulation scheme provided in this embodiment of this application may be used. The first version may be any one of {Rel-15, Rel-16} or any one of {Rel-15, Rel-16, Rel-17}, or may be another version. For another example, the transmitting end may determine, based on a channel condition, whether to use the conventional π/2-BPSK modulation scheme or the π/2-BPSK modulation scheme provided in this embodiment of this application.

In an implementation, before the transmitting end uses the π/2-BPSK modulation scheme provided in this embodiment of this application, the network device may enable the π/2-BPSK modulation scheme provided in this embodiment of this application.

In the foregoing manner, the transmitting end can be compatible with an existing protocol standard, and an uplink coverage capability can be enhanced.

In another possible implementation, the transmitting end may alternatively modulate the to-be-sent bit by using existing π/2-BPSK modulation. The receiving end performs phase shift on a signal by π/4 (or −π/4) before performing channel equalization on the received signal, and then performs phase shift on the signal by −π/4 (or π/4) after channel equalization. It should be noted that phase shift directions before and after channel equalization are opposite. For example, if phase shift is performed by π/4 before channel equalization, phase shift is performed by −π/4 after channel equalization. If phase shift is performed by −π/4 before channel equalization, phase shift is performed by π/4 after channel equalization.

In the foregoing manner, a channel equalized signal may be conjugate symmetric about a symmetry point in frequency domain. Therefore, the receiving end may determine a sent signal based on both two conjugate symmetric signals, to improve an interference suppression dimension, better reduce impact of interference and/or noise on the signals, and improve demodulation performance.

The following describes, with reference to a channel equalization method, an example of a process in which a transmitting end selects a codebook.

In a channel equalization process based on a receiving end, when a codebook indicated by a codebook index is $$\frac{1}{\sqrt{2}}\begin{bmatrix} 1 & 0 \\ 0 & e^{j\theta_q} \end{bmatrix},$$

a joint channel $h_{m1,eff}$ on a subcarrier m1 may be indicated as (for brevity of analysis impact of $1/\sqrt{2}$ in the codebook is omitted in a formula of this part of content):

$$h_{m1,eff} = \begin{bmatrix} h_{m_1} \\ h_{m_2}^* \end{bmatrix} = \begin{bmatrix} \tilde{h}_{0,m_1} & e^{j\theta_q}\tilde{h}_{1,m_1} \\ \tilde{h}_{0,m_2}^* & e^{-j\theta_q}\tilde{h}_{1,m_2}^* \end{bmatrix}, \text{where}$$

$\tilde{h}_{j,m_i}$ is a channel between a transmit antenna port j and all receive antenna ports, a dimension is $N_{rx}*1$, and a correlation matrix $$h_{m,eff}^H h_{m,eff}$$

of the joint channel may be indicated as (H indicates conjugate transposition):

$$H_{m,eff,corr} =$$
$$\begin{bmatrix} |\tilde{h}_{0,m_1}|^2 + |\tilde{h}_{0,m_2}|^2 & e^{j\theta_q}\tilde{h}_{0,m_1}^H\tilde{h}_{1,m_1} + e^{-j\theta_q}\left(\tilde{h}_{0,m_2}^H\tilde{h}_{1,m_2}\right)^* \\ e^{-j\theta_q}\tilde{h}_{1,m_1}^H\tilde{h}_{0,m_1} + e^{j\theta_q}\left(\tilde{h}_{1,m_2}^H\tilde{h}_{0,m_2}\right)^* & |\tilde{h}_{1,m_1}|^2 + |\tilde{h}_{1,m_2}|^2 \end{bmatrix},$$

where

Figure 13:
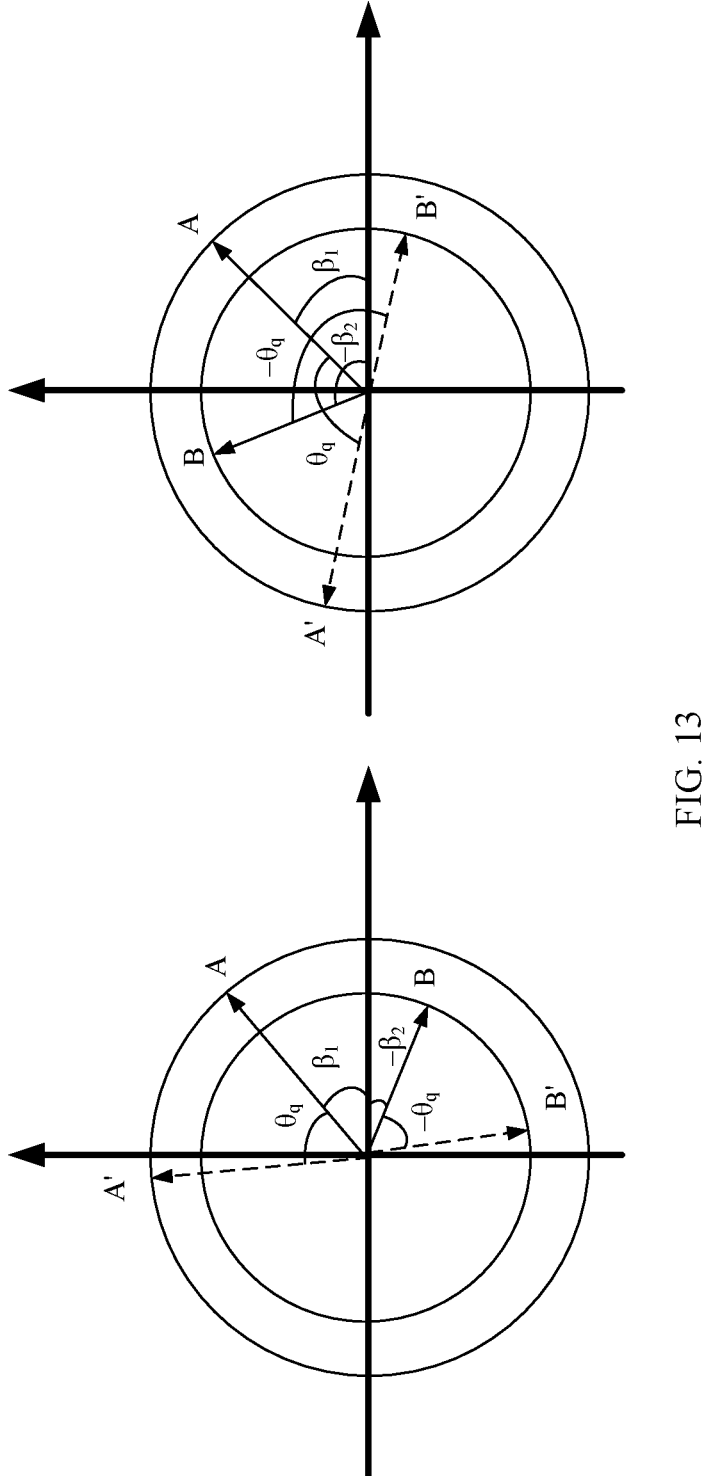
FIG. 13 is a schematic diagram of signal decomposition according to an embodiment of this application.

|x| indicates a modulo operation on x.

$$e^{j\theta_q}\tilde{h}_{0,m_1}^H\tilde{h}_{1,m_1} + e^{-j\theta_q}\left(\tilde{h}_{0,m_2}^H\tilde{h}_{1,m_2}\right)^*$$

and $$e^{-j\theta_q}\tilde{h}_{1,m_1}^H \tilde{h}_{0,m_1} + e^{j\theta_q}\left(\tilde{h}_{1,m_2}^H \tilde{h}_{0,m_2}\right)^*$$

in the foregoing formula may be considered as inter-stream interference.

$$e^{-j\theta_q}\tilde{h}_{1,m_1}^H \tilde{h}_{0,m_1}$$

is equal to a complex conjugate of $$e^{j\theta_q}\tilde{h}_{0,m_1}^H \tilde{h}_{1,m_1},$$

and $$e^{j\theta_q}\left(\tilde{h}_{1,m_2}^H \tilde{h}_{0,m_2}\right)^*$$

is equal to a complex conjugate of $$e^{-j\theta_q}\left(\tilde{h}_{0,m_2}^H \tilde{h}_{1,m_2}\right)^*,$$

that is, inter-stream interference powers are symmetric to each other. The following uses $$e^{j\theta_q}\tilde{h}_{0,m_1}^H \tilde{h}_{1,m_1} + e^{-j\theta_q}\left(\tilde{h}_{0,m_2}^H \tilde{h}_{1,m_2}\right)^*$$

as an example to analyze how to select a codebook.

$$\tilde{h}_{0,m_1}^H \tilde{h}_{1,m_1}$$

is indicated as a vector $$\overrightarrow{OA}, \text{ and } \left(\tilde{h}_{0,m_2}^H \tilde{h}_{1,m_2}\right)^*$$

is indicated as a vector $\overrightarrow{OB}$. As shown in FIG. 13, when inter-stream phase rotation $\theta_q$ is introduced, two interference components $$e^{j\theta_q}\tilde{h}_{0,m_1}^H \tilde{h}_{1,m_1}$$

and $$e^{-j\theta_q}\left(\tilde{h}_{0,m_2}^H \tilde{h}_{1,m_2}\right)^*$$

may be respectively understood as vectors $\overrightarrow{OA'}$ and $\overrightarrow{OB'}$ in the figure. It can be seen from the figure that, for a single subcarrier $m_i$, when $\theta_q$ results that directions of vectors $\overrightarrow{OA'}$ and $\overrightarrow{OB'}$ are opposite, or a phase difference between two interference degrees is $(2\ m+1)\pi$, a total interference power is lowest.

According to the foregoing analysis, the codebook cannot affect the PAPR of the multi-stream DFT-s-OFDM, that is, the codebook or $\theta_q$ needs to be applied to all scheduling bandwidths of the receiving end. Therefore, a final selection may depend on determining of total interference on all scheduling bandwidths. According to different principles, codebook selection methods may be classified as follows:

Method 1: A value set of $\theta_q$ is calculated according to a quantity of quantization bits of indicated $\theta_q$, an average interference power on all scheduling bandwidths is calculated for each $\theta_q$ value in the set, and $\theta_q$ with smallest average interference is selected as the first codebook.

Method 2: An average signal-to-interference ratio (signal-to-interference ratio, SIR) is maximized: A value set of $\theta_q$ is calculated according to a quantity of quantization bits of indicated $\theta_q$, an average SIR (signal power/interference power) on all the scheduling bandwidths is calculated for each $\theta_q$ value in the set, and $\theta_q$ with a largest average SIR is selected as the first codebook.

Method 3: An average signal-to-interference plus noise ratio (signal-to-interference plus noise ratio, SINR) is maximized: A value set of $\theta_q$ is calculated according to a quantity of quantization bits of indicated $\theta_q$, an average SINR (signal power/(interference power+noise power)) on all the scheduling bandwidths is calculated for each $\theta_q$ value in the set, and $\theta_q$ with a largest average SINR is selected as the first codebook.

Optionally, the average interference power, the average SIR, and the average SINR may be linear values, or may be decibel (dB) values. The codebook selection methods and calculation criteria may be determined by the network device, may be implementation behavior that belongs to the network device, or may be recommended by the terminal device.

In this embodiment of this application, a channel equalization method for determining a sent signal based on both two signals that are equal to a complex conjugate of each other is provided based on a channel between transmit and receive antennas and by using a characteristic of a DFT-s-OFDM signal of π/2-BPSK in frequency domain, and a phase rotation offset value is introduced between streams through precoding, to minimize equivalent inter-stream interference when the receiving end uses the channel equalization methods, without affecting a PAPR feature of DFT-s-OFDM, thereby improving demodulation performance of the receiving end. In addition, in this embodiment of this application, π/2-BPSK in the MCS table may correspond to a higher target bit rate, to ensure that coverage or performance can be improved in a high spectral efficiency range by using a low PAPR feature of pi/2-BPSK.

Figure 14:
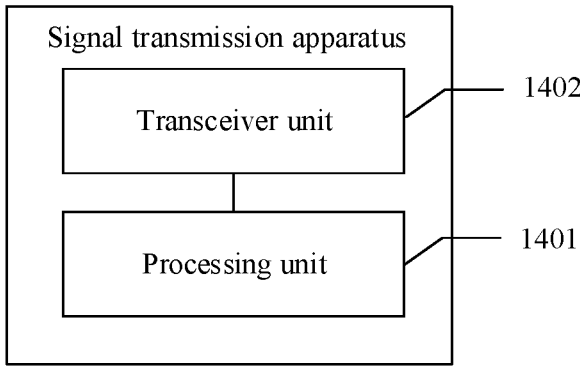
FIG. 14 is a schematic diagram of another structure of a signal transmission apparatus according to an embodiment of this application.

Based on a same inventive concept as the method embodiments, an embodiment of this application provides a signal transmission apparatus. A structure of the apparatus may be shown in FIG. 14, and include a processing unit 1401 and a transceiver unit 1402.

In an implementation, the signal transmission apparatus may be specifically configured to implement the method performed by the transmitting end in the foregoing embodiments. The apparatus may be the transmitting end, or may be a chip or a chip group in the transmitting end, or a part of a chip that is configured to perform a related method function. The transmitting end may be a network device or a terminal device. The processing unit 1401 is configured to precode N streams of signals based on a first codebook, to obtain N1 precoded signals. A quantity of non-zero elements in each row of the first codebook is 1. The first codebook causes a phase difference between signals sent on two transmit antenna ports. N and N1 are integers greater than 1. The transceiver unit 1402 is configured to send the N1 precoded signals.

For example, there is coherence between the two transmit antenna ports.

For example, the first codebook belongs to a codebook set. A quantity of non-zero elements in each row of each codebook in the codebook set is 1. Each codebook in the codebook set causes a phase difference between signals sent on two transmit antenna ports.

For example, when a quantity of transmit antenna ports is 2, each codebook in the codebook set is:

$$\frac{1}{\sqrt{2}}\begin{bmatrix} 1 & 0 \\ 0 & e^{j\theta} \end{bmatrix}, \frac{1}{\sqrt{2}}\begin{bmatrix} 0 & 1 \\ e^{j\theta} & 0 \end{bmatrix}, \frac{e^{j\theta_0}}{\sqrt{2}}\begin{bmatrix} 1 & 0 \\ 0 & e^{j\theta} \end{bmatrix}, \text{ or } \frac{e^{j\theta_0}}{\sqrt{2}}\begin{bmatrix} 0 & 1 \\ e^{j\theta} & 0 \end{bmatrix}, \text{ where}$$

$\theta$ is a phase difference between signals sent on the two transmit antenna ports.

For example, when a quantity of transmit antenna ports is 4, each codebook in the codebook set is:

$$e^{j\theta_0}\begin{bmatrix} 1 & 0 & e^{j\theta_2} & 0 \\ 0 & e^{j\theta_1} & 0 & e^{j\theta_3} \end{bmatrix}^T \text{ or } e^{j\theta_0}\begin{bmatrix} 1 & e^{j\theta_1} & 0 & 0 \\ 0 & 0 & e^{j\theta_2} & e^{j\theta_3} \end{bmatrix}^T, \text{ where}$$

$\theta_1$ is a phase difference between a signal sent on a second transmit antenna port and a signal sent on a first transmit antenna port, $\theta_2$ is a phase difference between a signal sent on a third transmit antenna port and a signal sent on the first transmit antenna port, and $\theta_3$ is a phase difference between a signal sent on a fourth transmit antenna port and a signal sent on the first transmit antenna port.

For example, a phase difference between signals sent on two transmit antenna ports meets the following formula:

$$\theta = \sum_{i=0}^{Q-1} b_i * \frac{\pi}{2^i}, \text{ where}$$

Q is a quantity of phase difference quantization bits, $b_i$ is an $i^{th}$ bit from a least significant bit to a most significant bit in bits indicating a phase difference in a codebook index, and i={0, 1, 2, . . . , Q−1}.

Optionally, the processing unit 1401 is further configured to: before precoding N streams of signals based on a first codebook, modulate a to-be-sent bit according to a modulation scheme corresponding to a first MCS index, where the modulation scheme corresponding to the first MCS index is $\pi/2$-BPSK; and perform layer mapping on a modulated to-be-sent bit, to obtain the N streams of signals.

For example, the modulation scheme is determined based on a preset MCS table. The MCS table includes a plurality of MCS indexes. A bit rate corresponding to a largest MCS index corresponding to the $\pi/2$-BPSK modulation scheme is greater than 314.

For example, the $\pi/2$-BPSK meets the following formula:

$$b(k) = e^{j\frac{\pi}{2}(k \bmod 2)}(1 - 2a(k)).$$

Alternatively, the pi/2-BPSK meets the following formula:

$$b(k) = \frac{e^{-j\frac{\pi}{4}}e^{j\frac{\pi}{2}(k \bmod 2)}}{\sqrt{2}}[(1 - 2a(k)) + j(1 - 2a(k))].$$

Alternatively, the pi/2-BPSK meets the following formula:

$$b(k) = \frac{e^{+j\frac{\pi}{4}}e^{j\frac{\pi}{2}(k \bmod 2)}}{\sqrt{2}}[(1 - 2a(k)) + j(1 - 2a(k))], \text{ where}$$

a(k) is a $k^{th}$ bit of the to-be-sent bit, b(k) is a modulation symbol corresponding to the $k^{th}$ bit, and k is an integer greater than 0 or equal to 0.

In another implementation, the signal transmission apparatus may be specifically configured to implement the method performed by the receiving end in the foregoing embodiments. The apparatus may be the receiving end, or may be a chip or a chip group in the receiving end, or a part of a chip that is configured to perform a related method function. The receiving end may be a network device or a terminal device. The transceiver unit 1402 is configured to receive signals on M subcarriers, where the signals are signals modulated according to $\pi/2$-BPSK, and M is a quantity of subcarriers included in a scheduling bandwidth. The processing unit 1401 is configured to determine an $m_1^{th}$ signal and an $m_2^{th}$ signal. The $m_1^{th}$ signal is determined based on an $m_1^{th}$ received signal and an $m_2^{th}$ received signal. The $m_2^{th}$ signal is determined based on the $m_1^{th}$ received signal and the $m_2^{th}$ received signal. The $m_1^{th}$ signal is equal to a complex conjugate of the $m_2^{th}$ signal.

The $m_1^{th}$ received signal is a signal received on an $m_1^{th}$ subcarrier in the M subcarriers. The $m_2^{th}$ received signal is a signal received on an $m_2^{th}$ subcarrier in the M subcarriers. The $m_1^{th}$ signal is a signal recovered on the $m_1^{th}$ subcarrier. The $m_2^{th}$ signal is a signal recovered on the $m_2^{th}$ subcarrier.

For example, a relationship between $m_1$ and $m_2$ is:

$$\text{When } m_1 = \left\{0, \ldots, \frac{M}{4} - 1\right\}, m_2 = \frac{M}{2} - m_1; \text{ and}$$

$$\text{when } m_1 = \left\{\frac{M}{2} + 1, \ldots, \frac{3M}{4} - 1\right\}, m_2 = \frac{3M}{2} - m_1.$$

Optionally, the processing unit 1401 is further configured to: after determining the $m_1^{th}$ signal and the $m_2^{th}$ signal, perform phase shift on M signals based on a first offset value. The first offset value is $\pi/4$ or $-\pi/4$, and the M signals are signals determined based on signals received on the M subcarriers.

Optionally, the processing unit 1401 is further configured to: before determining the $m_1^{th}$ signal and the $m_2^{th}$ signal, perform, based on a second offset value, phase shift on the signals received on the M subcarriers, where the second offset value is an opposite number of the first offset value.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module. It may be understood that for functions or implementations of the modules in embodiments of this application, further refer to related description in the method embodiments.

Figure 15:
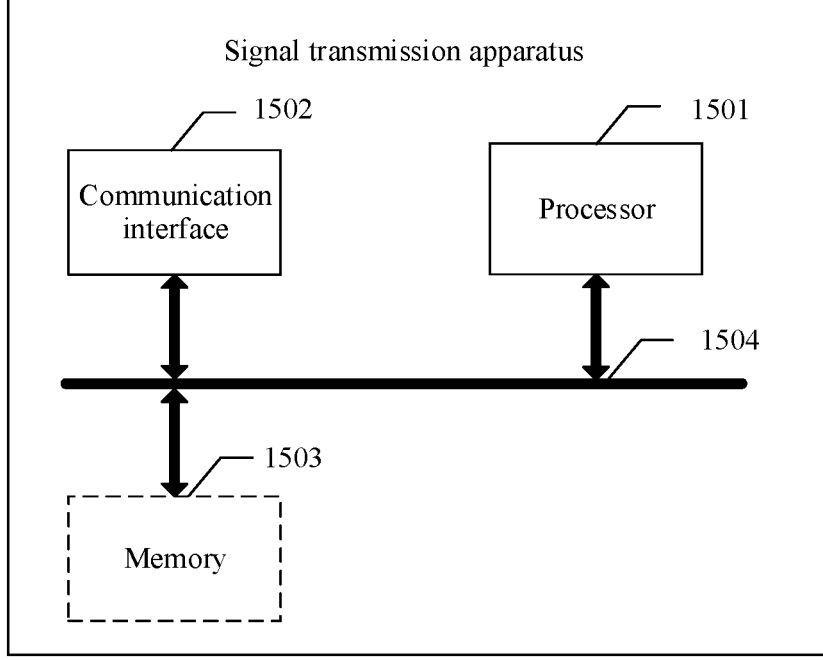
FIG. 15 is a schematic diagram of still another structure of a signal transmission apparatus according to an embodiment of this application.

In a possible manner, a signal transmission apparatus may be shown in FIG. 15. The apparatus may include a processor 1501 and a communication interface 1502, and may further include a memory 1503. The processing unit 1401 may be the processor 1501. The transceiver unit 1402 may be the communication interface 1502.

The processor 1501 may be a central processing unit (central processing unit, CPU), a digital processing unit, or the like. The communication interface 1502 may be a transceiver, an interface circuit such as a transceiver circuit, a transceiver chip, or the like. The apparatus further includes the memory 1503, configured to store a program executed by the processor 1501. The memory 1503 may be a non-volatile memory, for example, a hard disk drive (hard disk drive, HDD) or a solid-state drive (solid-state drive, SSD), or may be a volatile memory (volatile memory), for example, a random access memory (random access memory, RAM). The memory 1503 is any other medium that can be configured to carry or store expected program code in a form of an instruction or a data structure and that can be accessed by a computer, but is not limited thereto.

The processor 1501 is configured to execute the program code stored in the memory 1503, and is specifically configured to perform an action of the processing unit 1401. Details are not described herein again in this application. The communication interface 1502 is specifically configured to perform an action of the transceiver unit 1402. Details are not described herein again in this application.

In this embodiment of this application, a specific connection medium between the communication interface 1502, the processor 1501, and the memory 1503 is not limited. In this embodiment of this application, in FIG. 15, the memory 1503, the processor 1501, and the communication interface 1502 are connected by using a bus 1504. The bus is indicated by using a bold line in FIG. 15. A connection manner between other components is merely an example description, but does not constitute a limitation. The bus may be classified into an address bus, a data bus, a control bus, and the like. For ease of representation, only one bold line is used to indicate the bus in FIG. 15, but this does not mean that there is only one bus or only one type of bus.

An embodiment of this application further provides a communication apparatus, including a processor and an interface. The processor may be configured to perform the method in the foregoing method embodiments. It should be understood that the communication apparatus may be a chip. For example, the communication apparatus may be a field programmable gate array (field programmable gate array, FPGA), an application-specific integrated chip (application specific integrated circuit, ASIC), a system on chip (system on chip, SoC), a CPU, a network processor (network processor, NP), a digital signal processing circuit (digital signal processor, DSP), a micro controller unit (micro controller unit, MCU), a programmable controller (programmable logic device, PLD), or another integrated chip.

For example, the interface may be an interface circuit. For example, the interface circuit may be a code/data read/write interface circuit. The interface circuit may be configured to receive code instructions (where the code instructions are stored in a memory and may be directly read from the memory, or may be read from the memory by using another component), and transmit the code instructions to the processor. The processor may be configured to run the code instructions to perform the method in the foregoing method embodiments.

For another example, the interface circuit may alternatively be a signal transmission interface circuit between a communication processor and a transceiver. For example, in a sending scenario, the processor is configured to perform XX to obtain Y data (where XX is a non-air interface operation, and includes but is not limited to operations such as determining, judging, processing, calculating, searching, and comparing). The interface circuit may be configured to send the Y data to a transmitter (where the transmitter is configured to perform a sending operation on an air interface). For another example, in a receiving scenario, the interface circuit may be configured to receive Z data from a receiver (where the receiver is configured to perform a receiving operation on an air interface), and send the Z data to the processor. The processor is configured to perform XX processing on the Z data (where XX is a non-air interface operation, and includes but is not limited to operations such as determining, judging, processing, calculating, searching, and comparing).

Figure 16:
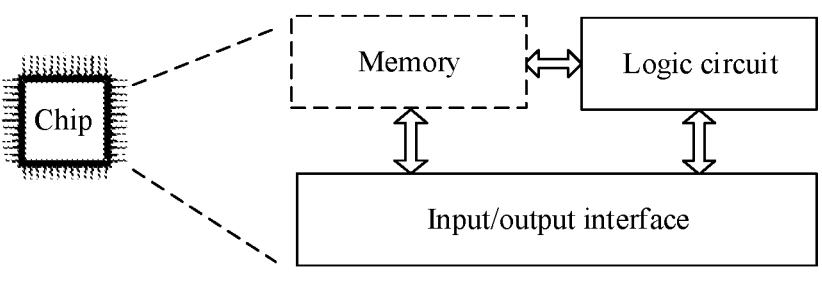
FIG. 16 is a schematic diagram of a structure of a chip according to an embodiment of this application.

For example, FIG. 16 shows a possible chip structure. The chip includes a logic circuit and an input/output interface, and may further include a memory. The input/output interface may be configured to receive code instructions (where the code instructions are stored in a memory and may be directly read from the memory, or may be read from the memory by using another component), and transmit the code instructions to the logic circuit. The logic circuit may be configured to run the code instructions to perform the method in the foregoing method embodiments.

Alternatively, the input/output interface may be a signal transmission interface circuit between the logic circuit and the transceiver. For example, in a sending scenario, the logic circuit is configured to perform XX to obtain Y data (where XX is a non-air interface operation, and includes but is not limited to operations such as determining, judging, processing, calculating, searching, and comparing). The input/output interface may be configured to send the Y data to a transmitter (where the transmitter is configured to perform a sending operation on an air interface). For another example, in a receiving scenario, the input/output interface may be configured to receive Z data from a receiver (where the receiver is configured to perform a receiving operation on an air interface), and send the Z data to the logic circuit. The logic circuit is configured to perform XX processing on the Z data (where XX is a non-air interface operation, and includes but is not limited to operations such as determining, judging, processing, calculating, searching, and comparing).

An embodiment of the present invention further provides a computer-readable storage medium, configured to store computer software instructions that need to be executed for execution of the foregoing processor, and the computer-readable storage medium includes a program that needs to be executed for execution of the foregoing processor.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A signal transmission method, wherein the method comprises:

precoding N streams of signals based on a first codebook, to obtain N1 precoded signals, wherein a quantity of non-zero elements in each row of the first codebook is 1, the first codebook causes a phase difference between signals sent on two transmit antenna ports, and N and N1 are integers greater than 1; and sending the N1 precoded signals, wherein the first codebook belongs to a codebook set, a quantity of non-zero elements in each row of each codebook in the codebook set is 1, and each codebook in the codebook set causes a phase difference between signals sent on two transmit antenna ports;

when a quantity of transmit antenna ports is 2, each codebook in the codebook set is:

$\theta$ is a phase difference between signals sent on the two transmit antenna ports.

2. The method according to claim 1, wherein there is coherence between the two transmit antenna ports.

3. The method according to claim 1, wherein a phase difference between signals sent on two transmit antenna ports meets the following condition:

$$\theta = \sum_{i=0}^{Q-1} b_i * \frac{\pi}{2^i}, \text{ wherein}$$

Q is a quantity of phase difference quantization bits, $b_i$ is an $i^{th}$ bit from a least significant bit to a most significant bit in the phase difference quantization bits, and i={0, 1, 2, . . . , Q−1}.

4. The method according to claim 1, wherein before the precoding N streams of signals based on a first codebook, the method further comprises:

modulating a to-be-sent bit according to a modulation scheme corresponding to a first modulation and coding scheme (MCS) index, wherein the modulation scheme corresponding to the first MCS index is π/2-binary phase shift keying (π/2-BPSK); and performing layer mapping on a modulated to-be-sent bit, to obtain the N streams of signals.

5. The method according to claim 4, wherein the modulation scheme is determined based on a preset MCS table, the MCS table comprises a plurality of MCS indexes, and a bit rate corresponding to a largest MCS index corresponding to the π/2-BPSK modulation scheme is greater than 314.

6. The method according to claim 4, wherein the π/2-BPSK meets the following formula:

$$b(k) = e^{j\frac{\pi}{2}(k \bmod 2)}(1 - 2a(k));$$

the π/2-BPSK meets the following formula:

$$b(k) = \frac{e^{-j\frac{\pi}{4}} e^{j\frac{\pi}{2}(k \bmod 2)}}{\sqrt{2}}[(1 - 2a(k)) + j(1 - 2a(k))]; \text{ or}$$

the π/2-BPSK meets the following formula:

$$b(k) = \frac{e^{+j\frac{\pi}{4}} e^{j\frac{\pi}{2}(k \bmod 2)}}{\sqrt{2}}[(1 - 2a(k)) + j(1 - 2a(k))], \text{ wherein}$$

a(k) is a $k^{th}$ bit of the to-be-sent bit, b(k) is a modulation symbol corresponding to the $k^{th}$ bit, and k is an integer greater than or equal to 0.

7. A signal transmission method, wherein the method comprises:

receiving signals on M subcarriers, wherein the signals are signals modulated according to π/2-binary phase shift keying (π/2-BPSK), and M is a quantity of subcarriers comprised in a scheduling bandwidth; and determining an $m_1^{th}$ signal and an $m_2^{th}$ signal, wherein the $m_1^{th}$ signal is determined based on an $m_1^{th}$ received signal and an $m_2^{th}$ received signal, the $m_2^{th}$ signal is determined based on the myth received signal and the $m_2^{th}$ received signal, and the $m_1^{th}$ signal is equal to a complex conjugate of the $m_2^{th}$ signal; and the myth received signal is a signal received on an $m_1^{th}$ subcarrier in the M subcarriers, the $m_2^{th}$ received signal is a signal received on an $m_2^{th}$ subcarrier in the M subcarriers, the $m_1{}^{th}$ signal is a signal recovered on the $m_1{}^{th}$ subcarrier, and the $m_2{}^{th}$ signal is a signal recovered on the $m_2$th subcarrier.

8. The method according to claim 7, wherein a relationship between $m_1$ and $m_2$ is:

$$\text{when } m_1 = \left\{0, \dots, \frac{M}{4} - 1\right\}, m_2 = \frac{M}{2} - m_1; \text{ and}$$

$$\text{when } m_1 = \left\{\frac{M}{2} + 1, \dots, \frac{3M}{4} - 1\right\}, m_2 = \frac{3M}{2} - m_1.$$

9. The method according to claim 7, wherein after the determining an $m_1{}^{th}$ signal and an $m_2{}^{th}$ signal, the method further comprises:

performing phase shift on M signals based on a first offset value, wherein the first offset value is $\pi/4$ or $-\pi/4$, and the M signals are signals determined based on signals received on the M subcarriers.

10. The method according to claim 9, wherein before the determining an $m_1{}^{th}$ signal and an $m_2{}^{th}$ signal, the method further comprises:

performing, based on a second offset value, phase shift on the signals received on the M subcarriers, wherein the second offset value is an opposite number of the first offset value.

11. An apparatus, comprising:

a processor; and a computer-readable storage medium storing a program to be executed by the processor, the program including instructions to cause the processor to:

precode N streams of signals based on a first codebook, to obtain N1 precoded signals, wherein a quantity of non-zero elements in each row of the first codebook is 1, the first codebook causes a phase difference between signals sent on two transmit antenna ports, and N and N1 are integers greater than 1; and send the N1 precoded signals, wherein the first codebook belongs to a codebook set, a quantity of non-zero elements in each row of each codebook in the codebook set is 1, and each codebook in the codebook set causes a phase difference between signals sent on two transmit antenna ports;

when a quantity of transmit antenna ports is 2, each codebook in the codebook set is:

$\theta$ is a phase difference between signals sent on the two transmit antenna ports.

12. The apparatus according to claim 11, wherein there is coherence between the two transmit antenna ports.

13. The apparatus according to claim 11, wherein a phase difference between signals sent on two transmit antenna ports meets the following condition:

$$\theta = \sum_{i=0}^{Q-1} b_i * \frac{\pi}{2^i}, \text{ wherein}$$

Q is a quantity of phase difference quantization bits, $b_i$ is an $i^{th}$ bit from a least significant bit to a most significant bit in the phase difference quantization bits, and i={0, 1, 2, . . . , Q−1}.

14. The apparatus according to claim 11, wherein the program includes further instructions to cause the processor to:

before precoding the N streams of signals based on the first codebook, modulate a to-be-sent bit according to a modulation scheme corresponding to a first modulation and coding scheme (MCS) index, wherein the modulation scheme corresponding to the first MCS index is $\pi/2$-binary phase shift keying ($\pi/2$-BPSK); and perform layer mapping on a modulated to-be-sent bit, to obtain the N streams of signals.

15. The apparatus according to claim 14, wherein the modulation scheme is determined based on a preset MCS table, the MCS table comprises a plurality of MCS indexes, and a bit rate corresponding to a largest MCS index corresponding to the $\pi/2$-BPSK modulation scheme is greater than 314.

16. The apparatus according to claim 14, wherein the $\pi/2$-BPSK meets the following formula:

$$b(k) = e^{j\frac{\pi}{2}(k \bmod 2)}(1 - 2a(k));$$

the $\pi/2$-BPSK meets the following formula:

$$b(k) = \frac{e^{-j\frac{\pi}{4}}e^{j\frac{\pi}{2}(k \bmod 2)}}{\sqrt{2}}[(1 - 2a(k)) + j(1 - 2a(k))]; \text{ or}$$

the $\pi/2$-BPSK meets the following formula:

$$b(k) = \frac{e^{+j\frac{\pi}{4}}e^{j\frac{\pi}{2}(k \bmod 2)}}{\sqrt{2}}[(1 - 2a(k)) + j(1 - 2a(k))], \text{ wherein}$$

a(k) is a $k^{th}$ bit of the to-be-sent bit, b(k) is a modulation symbol corresponding to the $k^{th}$ bit, and k is an integer greater than or equal to 0.

\* \* \* \* \*